United States Patent
Bornstein

Patent Number: 6,144,388
Date of Patent: Nov. 7, 2000

[54] PROCESS FOR DISPLAYING ARTICLES OF CLOTHING ON AN IMAGE OF A PERSON

[76] Inventor: Raanan Bornstein, 1467 Morton Ave., Los Altos, Calif. 94024

[21] Appl. No.: 09/075,692

[22] Filed: May 11, 1998

Related U.S. Application Data

[60] Provisional application No. 60/077,149, Mar. 6, 1998.

[51] Int. Cl.[7] ............................................. G06T 1/00
[52] U.S. Cl. .......................................................... 345/435
[58] Field of Search .................................. 345/433, 434, 345/435, 436, 437, 438, 439

[56] References Cited

U.S. PATENT DOCUMENTS

| | | | |
|---|---|---|---|
| 5,880,740 | 3/1999 | Halliday et al. | 345/435 |
| 5,917,495 | 6/1999 | Doi et al. | 345/435 |
| 5,920,325 | 7/1999 | Morgan et al. | 345/435 |
| 5,936,606 | 8/1999 | Lie | 345/435 |
| 5,995,724 | 11/1999 | Mikkelsen et al. | 345/435 |
| 5,999,191 | 12/1999 | Frank et al. | 345/435 |
| 6,014,146 | 1/2000 | Freeman | 345/435 |

*Primary Examiner*—Phu K. Nguyen
*Assistant Examiner*—Cliff N. Vo

[57] ABSTRACT

A computer-implemented process of generating a two-dimensional image of a selected article of clothing superimposed at a location on a two-dimensional image of a person using a computer network having at least a server and a client computer is described. The computer-implemented process of the present invention includes: (1) retrieving the two-dimensional image of the person from a two-dimensional database; (2) obtaining user's picture three-dimensional clothing parameters associated with the person, the user's picture three-dimensional clothing parameters specifies at least the location of a generic article of clothing on the image of the person; (3) manipulating using at least one of the server and the client computer the three-dimensional model of the selected article of clothing according to the user's picture three-dimensional clothing parameters such that the selected article of clothing is positioned at the location on the image of the person; (4) converting the three-dimensional model of the selected article of clothing into a two-dimensional image; and (5) assembling the two-dimensional image of the selected article of clothing on the image of the person and thereby generating a two-dimensional image of the article of clothing on the image of the person.

54 Claims, 22 Drawing Sheets

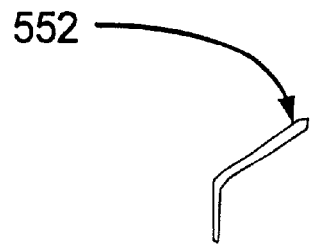
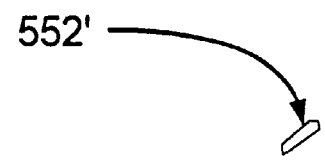
Figure 13A    Figure 13B
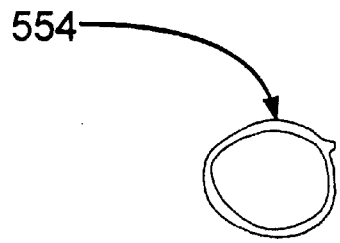
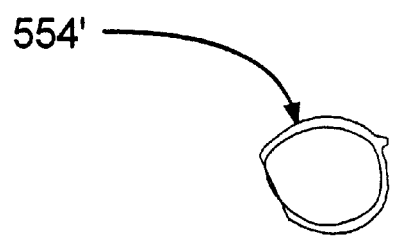
Figure 14A    Figure 14B
Figure 15

PROCESS FOR DISPLAYING ARTICLES OF CLOTHING ON AN IMAGE OF A PERSON

CLAIM OF PRIORITY

This application claims priority to a U.S. Provisional patent application Ser. No. 60/077,149 filed on Mar. 6, 1998, which is herein incorporated by reference.

BACKGROUND OF THE INVENTION

The present invention relates to a computer-implemented technique generating a two-dimensional image of an article of clothing superimposed on an image of a person. More particularly, the present invention uses a two-dimensional image of the person and a three-dimensional model of the article of clothing to generate on a computer display device the two-dimensional image of article of clothing superimposed on the image of the person.

FIG. 1 shows a two dimensional image of a person 100 that may be in a picture, photograph or the like. FIG. 2A shows a two-dimensional image of an article of clothing, e.g., a pair of eye-glasses 102. FIG. 2B shows a two-dimensional image, in which pair of glasses 102 are superimposed on image of a person 100.

By superimposing an article of clothing on an image of a person, a user can see how he/she or another would look wearing the article of clothing without actually physically trying on that article of clothing. The term "superimposed," as used in connection with the description of this invention, refers to laying out of articles of clothing on the image of a person, which image serves as the background. A "user," in connection with the description of this invention, refers to someone who wishes to see himself/herself or another person wearing an article of clothing, without actually having himself/herself or another person trying on that article of clothing.

According to one current approach (also referred to herein as the "first approach"), a resultant two-dimensional image of an article of clothing superimposed on an image of a person (e.g., FIG. 2B) is realized by combining a three-dimensional model of an article of clothing and a three-dimensional model of the person and then by employing techniques well known to those skilled in the art, converting the resulting three-dimensional model to a two-dimensional image. Although the first approach attempts to precisely depict the person wearing the article of clothing, as shown in FIG. 2B, it is extremely time-consuming. By way of example, the process of scanning the three-dimensional model of the person is particularly time-consuming and cumbersome for the user or the operator of the system employed for superimposing the article of clothing on the image of a person. As another example, manipulating and storing the extensive data associated with the three-dimensional models during algorithmic processing is also time-consuming. In fact, the entire process of generating an image of a person wearing an article of clothing is so slow that the first approach is impractical and commercially unfeasible.

Another approach (also referred to herein as the "second approach") of generating the two-dimensional image of an article of clothing superimposed on an image of a person involves combining a two-dimensional image of the article of clothing (e.g., FIG. 2A) and a two-dimensional image of a person (e.g., FIG. 1). Although the second approach generates the image relatively quickly, it fails to show the image of selected article of clothing superimposed in a normal position on the image of the person when the position of the person (in the image of a person) is misaligned or shifted relative to the position of the article of clothing (in the image of the article of clothing). The second approach, therefore, tends to imprecisely depict the image of a person and an article of clothing together and renders this approach as a commercially non-viable technique for trying on clothes without actually wearing them.

Furthermore, the two approaches described above fail to effectively capture in their resulting two-dimensional image a "natural" look realized due to different properties associated with articles of clothing, e.g., the draping effect of soft fabrics on the image of a person produced by creases, wrinkles and/or bends in the soft fabric, the appropriate alignment of the article of clothing on the image of a person, etc. The term "natural look," as used in connection with the description of this invention, refers to the realistic visual effects created by an article of clothing when the article of clothing is actually worn by a person.

Further still, the second approach, in its attempt to generate the two-dimensional image of FIG. 2B, also fails to effectively deal with the presence of an extraneous object located on the image of a person where the image of an article of clothing is subsequently superimposed. By way of example, in FIG. 1, if the left eye in image of a person 100 was covered by the person's hand, then in its attempt to generate the two-dimensional image of FIG. 2B, the second approach depicts the eye-glasses erroneously covering the person's hand as opposed to correctly showing the eye-glasses in their typical or normal position, i.e. positioned underneath the person's hand. Consequently, the above-described second approach, in its attempt to generate the image of the person wearing the eye-glasses as shown in FIG. 2B, fails to deal with different properties of articles of clothing and/or an anomaly in the image of a person and, therefore, the resulting two-dimensional image is not a normal and/or natural representation of a person wearing the article of clothing.

What is therefore needed is a system and method for quickly and precisely generating a two-dimensional image of an article of clothing superimposed on an image of a person that depicts the person normally and naturally wearing the article of clothing (i.e. a photo realistic result), when in fact that person is not actually wearing that article of clothing.

SUMMARY OF THE INVENTION

To achieve the foregoing, in one aspect, the present invention provides a computer-implemented process of generating a two-dimensional image of a selected article of clothing superimposed at a location on a two-dimensional image of a person using a computer network having at least a server and a client computer. The process includes: (1) retrieving the two-dimensional image of the person from a two-dimensional database; (2) obtaining user's picture three-dimensional clothing parameters associated with the person, the user's picture three-dimensional clothing parameters specifies at least the location of a generic article of clothing on the image of the person; (3) manipulating using at least one of the server and the client computer the three-dimensional model of the selected article of clothing according to the user's picture three-dimensional clothing parameters such that the selected article of clothing is positioned at the location on the image of the person; (4) converting the three-dimensional model of the selected article of clothing into a two-dimensional image; and (5) assembling the two-dimensional image of the selected article of clothing on the image of the person and thereby generating a two-dimensional image of the article of clothing on the image of the person.

The step of retrieving the image of the person may include retrieving the image of the person from a magnetic storage disk or from a memory storage area of a World Wide Web server. The step of obtaining the user's picture three-dimensional clothing parameters may include manipulating using at least one of the server and the client computer the three-dimensional model of generic article of clothing such that the generic article of clothing is positioned at the location on the image of the person and the user's picture three-dimensional clothing parameters define the position of the generic article of clothing at the location on the image of the person. The user's picture three-dimensional clothing parameters may include at least one of X and Y coordinates, alpha, beta and gamma angles and a scaling factor, wherein the alpha angle is an angle with respect to the X-axis, the beta angle is an angle with respect to the Y-axis and the gamma angle with respect to the Z-axis.

In one embodiment, the process of generating a two dimensional image of a selected article of clothing superimposed at a location on a two-dimensional image of a person may further include: (1) obtaining a component breakdown scheme, the component breakdown scheme specifies a manner in which said generic article of clothing is dismembered into components of the generic article of clothing; (2) dismembering using a processor the three-dimensional model of the selected article of clothing into three-dimensional models of components of the selected article of clothing as specified by the component breakdown scheme; (3) obtaining component assembly order information, wherein the component assembly order information specifies an order in which the components of the selected article of clothing are assembled on the image of the person. In this embodiment, the step of converting includes rendering the three-dimensional models of the components of the selected article of clothing into two-dimensional images of the components of the selected article of clothing, such that the two-dimensional images of the components of the selected article of clothing reflects the texture, color, opacity and bump maps of the three-dimensional models of the components of the selected article of clothing. Furthermore, in this embodiment, the step of assembling includes assembling the two-dimensional images of the components of the selected article of clothing as specified by the component assembly order information on the image of the person.

The step of obtaining the component breakdown scheme, mentioned above, includes dividing the three-dimensional angle space of the three-dimensional model of the generic article of clothing into three-dimensional sectors and for each one of said three-dimensional sectors specifying the component breakdown scheme. In one embodiment, the step of obtaining the component assembly order information is determined by a graphic designer, who specifies the component assembly order information for each three-dimensional sector of the generic article of clothing, and the three-dimensional sector results from dividing the three-dimensional angle space of the generic article of clothing.

In the above-described process, the step of manipulating the three-dimensional model of the selected article of clothing may include scaling the three-dimensional model of selected article of clothing such that the size of the three-dimensional model of the selected article of clothing is increased or decreased by substantially same amount as the size of the three-dimensional model of the generic article of clothing is increased or decreased and the user's picture three-dimensional clothing parameters specify the amount by which the size of the three-dimensional model of the generic article of clothing is increased or decreased. The step of converting the three-dimensional model of the selected article of clothing may include rendering the three-dimensional model of the selected article of clothing to form the two-dimensional image of the selected article of clothing such that the two-dimensional image of the article of clothing reflects the texture, color, opacity and bump maps of the three-dimensional model of the selected article of clothing. The article of clothing may include eye-glasses, t-shirts, pants, shirts, tops, watches, rings, necklaces, jewelry items, earrings, shoes, socks, ties and the like.

The user's picture three-dimensional clothing parameters may further include data for warping of the generic article of clothing, the warping simulates draping effect of a soft article of clothing material on a body of the person when the person wears the soft article of clothing material. The information about warping may include locations where at least one of wrinkles, creases and bends in the soft article of clothing are drawn by an operator when the operator positions the generic article of clothing at the location on the image of the person.

The step of manipulating the three-dimensional model of the selected article of clothing may further include warping the three-dimensional model of the selected article of clothing such that the three-dimensional model of the selected article of clothing includes wrinkles, creases and bends in the soft article of clothing to effectively simulate the draping effect of the soft article of clothing when the person wears the soft article of clothing material.

The process of generating a two dimensional image of a selected article of clothing superimposed at a location on a two-dimensional image of a person may further include using at least one of the server or the client computer and presenting to a user the two-dimensional image of the article of clothing superimposed on the image of the person. The computer network may be Internet, Intranet or enterprise network.

In another aspect, the present invention provides a computer-implemented process of generating a two dimensional image of a selected article of clothing superimposed at a location on a two-dimensional image of a person using a computer. The process includes: (1) retrieving the two-dimensional image of the person from a two-dimensional database; (2) obtaining user's picture three-dimensional clothing parameters associated with the person, the user's picture three-dimensional clothing parameters specifies at least the location of a generic article of clothing on the image of the person; (3) manipulating using the computer the three-dimensional model of the selected article of clothing according to the user's picture three-dimensional clothing parameters such that the selected article of clothing is positioned at the location on the image of the person; (4) converting the three-dimensional model of the selected article of clothing into a two-dimensional image; and (4) assembling the two-dimensional image of the selected article of clothing on the image of the person and thereby generating a two-dimensional image of the article of clothing on the image of the person.

The step of retrieving the image of the person may include retrieving the image of the person from a magnetic storage disk or from a memory storage area of a World Wide Web server. The step of obtaining the user's picture three-dimensional clothing parameters may include manipulating using the computer the three-dimensional model of generic article of clothing such that the generic article of clothing is positioned at the location on the image of the person and the user's picture three-dimensional clothing parameters define the position of the generic article of clothing at the location on the image of the person. The user's picture three-dimensional clothing parameters may include at least one of X and Y-coordinates, alpha, beta and gamma angles and a scaling factor, wherein the alpha angle is an angle with respect to the X-axis, the beta angle is an angle with respect to the Y-axis and the gamma angle with respect to the Z-axis.

In one embodiment, the process of generating a two dimensional image of a selected article of clothing superimposed at a location on a two-dimensional image of a person may further include: (1) obtaining a component breakdown scheme, the component breakdown scheme specifies a manner in which said generic article of clothing is dismembered into components of the generic article of clothing; (2) dismembering using a processor the three-dimensional model of the selected article of clothing into three-dimensional models of components of the selected article of clothing as specified by the component breakdown scheme; (3) obtaining component assembly order information, wherein the component assembly order information specifies an order in which the components of the selected article of clothing are assembled on the image of the person. In this embodiment, the step of converting includes rendering the three-dimensional models of the components of the selected article of clothing into two-dimensional images of the components of the selected article of clothing, such that the two-dimensional images of the components of the selected article of clothing reflects the texture, color, opacity and bump maps of the three-dimensional models of the components of the selected article of clothing. Furthermore, in this embodiment, the step of assembling includes assembling the two-dimensional images of the components of the selected article of clothing as specified by the component assembly order information on the image of the person.

The step of obtaining the component breakdown scheme, mentioned above, includes dividing the three-dimensional angle space of the three-dimensional model of the generic article of clothing into three-dimensional sectors and for each one of said three-dimensional sectors specifying the component breakdown scheme. In one embodiment, the step of obtaining the component assembly order information is determined by a graphic designer, who specifies the component assembly order information for each three-dimensional sector of the generic article of clothing, and the three-dimensional sector results from dividing the three-dimensional angle space of the generic article of clothing.

In the above-described process, the step of manipulating the three-dimensional model of the selected article of clothing may include scaling the three-dimensional model of selected article of clothing such that the size of the three-dimensional model of the selected article of clothing is increased or decreased by substantially same amount as the size of the three-dimensional model of the generic article of clothing is increased or decreased and the user's picture three-dimensional clothing parameters specify the amount by which the size of the three-dimensional model of the generic article of clothing is increased or decreased. The step of converting the three-dimensional model of the selected article of clothing may include rendering the three-dimensional model of the selected article of clothing to form the two-dimensional image of the selected article of clothing such that the two-dimensional image of the article of clothing reflects the texture, color, opacity and bump maps of the three-dimensional model of the selected article of clothing. The article of clothing may include eye-glasses, t-shirts, pants, shirts, tops, watches, rings, necklaces, jewelry items, earrings, shoes, socks, ties and the like.

The step of obtaining the component breakdown scheme may include dividing the three-dimensional angle space of the three-dimensional model of the generic article of clothing into three-dimensional sectors and for each one of the three-dimensional sectors specifying the component breakdown scheme.

The step of obtaining the component assembly order information may be determined by a graphic designer who specifies the component assembly order information for each three-dimensional sector of the generic article of clothing, the three-dimensional sector results from dividing the three-dimensional angle space of the generic article of clothing.

The step of manipulating the three-dimensional model of the selected article of clothing may include scaling the three-dimensional model of selected article of clothing such that the size of the three-dimensional model of the selected article of clothing is increased or decreased by substantially same amount as the size of the three-dimensional model of the generic article of clothing is increased or decreased and the user's picture three-dimensional clothing parameters specify the amount by which the size of the three-dimensional model of the generic article of clothing is increased or decreased. The step of converting the three-dimensional model of the selected article of clothing may include rendering the three-dimensional model of the selected article of clothing to form the two-dimensional image of the selected article of clothing such that the two-dimensional image of the article of clothing reflects the texture, color, opacity and bump maps of the three-dimensional model of the selected article of clothing. The article of clothing may generally include such items as eye-glasses, t-shirts, pants, shirts, tops, watches, rings, necklaces, jewelry items, earrings, shoes, socks, ties and the like.

The user's picture three-dimensional clothing parameters may further include data for warping of the generic article of clothing. Warping simulates draping effect of a soft article of clothing material on a body of the person when the person wears the soft article of clothing material. The information about warping may include locations where at least one of wrinkles, creases and bends in the soft article of clothing are drawn by an operator when the operator positions the generic article of clothing at the location on the image of the person. The step of manipulating the three-dimensional model of the selected article of clothing may further include warping using the computer the three-dimensional model of the selected article of clothing such that the three-dimensional model of the selected article of clothing includes wrinkles, creases and bends in the soft article of clothing to effectively simulate the draping effect of the soft article of clothing when the person wears the soft article of clothing material. The process may further include using the computer and presenting to a user the two-dimensional image of the article of clothing superimposed on the image of the person. The computer is a personal computer.

In yet another aspect, the present invention provides a computer readable medium comprising instructions for generating a two dimensional image of a selected article of clothing superimposed at a location on a two-dimensional image of a person using a computer. The computer readable medium includes: (1) instructions configured for retrieving the two-dimensional image of the person from a two-dimensional database; (2) instructions configured for obtaining user's picture three-dimensional clothing parameters associated with the person, the user's picture three-dimensional clothing parameters specifies at least the location of a generic article of clothing on the image of the person; (3) instructions configured for manipulating using the computer the three-dimensional model of the selected article of clothing according to the user's picture three-dimensional clothing parameters such that the selected article of clothing is positioned at the location on the image of the person; (4) instructions configured for converting the three-dimensional model of the selected article of clothing into a two-dimensional image; and (5) instructions configured for assembling the two-dimensional image of the selected article of clothing on the image of the person and thereby generating a two-dimensional image of the article of clothing on the image of the person.

The instructions configured for retrieving the image of the person may include instructions configured for retrieving the image of the person from a magnetic storage disk or from a memory storage area of a World Wide Web server. The instructions configured for obtaining the user's picture three-dimensional clothing parameters may include instructions configured for manipulating using the computer the three-dimensional model of generic article of clothing such that the generic article of clothing is positioned at the location on the image of the person and the user's picture three-dimensional clothing parameters define the position of the generic article of clothing at the location on the image of the person. The user's picture three-dimensional clothing parameters may include at least one of X and Y-coordinates, alpha, beta and gamma angles and a scaling factor, wherein the alpha angle is an angle with respect to the X-axis, the beta angle is an angle with respect to the Y-axis and the gamma angle with respect to the Z-axis.

In one embodiment, the computer readable medium comprising instructions for generating a two dimensional image of a selected article of clothing superimposed at a location on a two-dimensional image of a person may further include: (1) instructions configured for obtaining a component breakdown scheme, which specifies a manner in which said generic article of clothing is dismembered into components of the generic article of clothing; (2) instructions configured for dismembering using a processor the three-dimensional model of the selected article of clothing into three-dimensional models of components of the selected article of clothing as specified by the component breakdown scheme; (3) instructions configured for obtaining component assembly order information, wherein the component assembly order information specifies an order in which the components of the selected article of clothing are assembled on the image of the person. In this embodiment, the instructions configured for converting includes instructions configured for rendering the three-dimensional models of the components of the selected article of clothing into two-dimensional images of the components of the selected article of clothing, such that the two-dimensional images of the components of the selected article of clothing reflects the texture, color, opacity and bump maps of the three-dimensional models of the components of the selected article of clothing. Furthermore, in this embodiment, the instructions configured for assembling includes assembling the two-dimensional images of the components of the selected article of clothing as specified by the component assembly order information on the image of the person.

The instructions configured for obtaining the component breakdown scheme, mentioned above, includes dividing the three-dimensional angle space of the three-dimensional model of the generic article of clothing into three-dimensional sectors and for each one of said three-dimensional sectors specifying the component breakdown scheme. In one embodiment, the instructions configured for obtaining the component assembly order information are obtained by a graphic designer, who specifies the component assembly order information for each three-dimensional sector of the generic article of clothing, and the three-dimensional sector results from dividing the three-dimensional angle space of the generic article of clothing.

In the above-described computer readable medium, the instructions configured for manipulating the three-dimensional model of the selected article of clothing may include instructions configured for scaling the three-dimensional model of selected article of clothing such that the size of the three-dimensional model of the selected article of clothing is increased or decreased by substantially same amount as the size of the three-dimensional model of the generic article of clothing is increased or decreased and the user's picture three-dimensional clothing parameters specify the amount by which the size of the three-dimensional model of the generic article of clothing is increased or decreased. The instructions configured for converting the three-dimensional model of the selected article of clothing may include instructions configured for rendering the three-dimensional model of the selected article of clothing to form the two-dimensional image of the selected article of clothing such that the two-dimensional image of the article of clothing reflects the texture, color, opacity and bump maps of the three-dimensional model of the selected article of clothing. The computer readable medium of the present invention generally includes a tape, a floppy disk, a CD ROM, a carrier wave. In a preferred embodiment, however, the computer readable medium of the present invention is a carrier wave.

The instructions for the component breakdown scheme may include instructions configured for dividing the three-dimensional angle space of the three-dimensional model of the generic article of clothing into three-dimensional sectors and instructions configured for specifying the component breakdown scheme for each one of the three-dimensional sectors.

The instructions configured for manipulating the three-dimensional model of the selected article of clothing may include instructions configured for scaling the three-dimensional model of selected article of clothing such that the size of the three-dimensional model of the selected article of clothing is increased or decreased by substantially same amount as the size of the three-dimensional model of the generic article of clothing is increased or decreased and the user's picture three-dimensional clothing parameters specify the amount by which the size of the three-dimensional model of the generic article of clothing is increased or decreased.

The instructions configured for converting the three-dimensional model of the selected article of clothing may include instructions configured for rendering the three-dimensional model of the selected article of clothing to form the two-dimensional image of the selected article of clothing such that the two-dimensional image of the article of clothing reflects the texture, color, opacity and bump maps of the three-dimensional model of the selected article of clothing. The article of clothing may include eye-glasses, t-shirts, pants, shirts, tops, watches, rings, necklaces, jewelry items, earrings, shoes, socks, ties.

In one embodiment, the user's picture three-dimensional clothing parameters may further include data for warping of the generic article of clothing, the warping simulates draping effect of a soft article of clothing material on a body of the person when the person wears the soft article of clothing material. The information about warping may include locations where at least one of wrinkles, creases and bends in the soft article of clothing are drawn by an operator when the operator positions the generic article of clothing at the location on the image of the person.

The instructions configured for manipulating the three-dimensional model of the selected article of clothing may further include instructions configured for warping the three-dimensional model of the selected article of clothing such that the three-dimensional model of the selected article of clothing includes wrinkles, creases and bends in the soft article of clothing to effectively simulate the draping effect of the soft article of clothing when the person wears the soft article of clothing material. The process may further include instructions configured for presenting to a user using the computer the two-dimensional image of the article of clothing superimposed on the image of the person.

In yet another aspect, the present invention provides a computer-implemented process for permitting a user to generate a two-dimensional image of a selected article of clothing superimposed at a location on a two-dimensional image of a person. The computer implemented process includes: (1) placing a first set of instructions onto a server of a computer network, the first set of instructions including instructions for: (a) retrieving the two-dimensional image of the person from a database; (b) obtaining user's picture three-dimensional clothing parameters associated with the person, the user's picture three-dimensional clothing parameters specifies at least the location of a generic article of clothing on the image of the person; (c) manipulating using at least one of the server and the client computer the three-dimensional model of the selected article of clothing according to the user's picture three-dimensional clothing parameters such that the selected article of clothing is positioned at the location on the image of the person; (d) converting the three-dimensional model of the selected article of clothing into a two-dimensional image; and (e) assembling the two-dimensional image of the selected article of clothing on the image of the person and thereby generating a two-dimensional image of the article of clothing on the image of the person; and (2) providing a second set of instructions to the server to the server, the second set of instructions to the server being configured to permit the first set of instructions to be transmitted to the user of the computer network, wherein the transmitted first set of instructions are configured to be executed at a computer terminal to generate by the user the two-dimensional image of the article of clothing on the image of the person.

The step of placing the first set of instructions may further include placing instructions for the obtaining the user's picture three-dimensional clothing parameters includes manipulating using at least one of the server and the client computer the three-dimensional model of generic article of clothing such that the generic article of clothing is positioned at the location on the image of the person and the user's picture three-dimensional clothing parameters define the position of the generic article of clothing at the location on the image of the person. The user's picture three-dimensional clothing parameters may include at least one of X and Y-coordinates, alpha, beta and gamma angles and a scaling factor, wherein the alpha angle is an angle with respect to the X-axis, the beta angle is an angle with respect to the Y-axis and the gamma angle with respect to the Z-axis.

The step of placing the first set of instructions may further include placing instructions for: (1) obtaining a component breakdown scheme, which specifies a manner in which the generic article of clothing is dismembered into components of the generic article of clothing; (2) dismembering using a processor the three-dimensional model of the selected article of clothing into three-dimensional models of components of the selected article of clothing as specified by the component breakdown scheme; (3) obtaining component assembly order information, wherein the component assembly order information specifies an order in which the components of the selected article of clothing are assembled on the image of said person. In this embodiment of the inventive process, the instructions for converting include instructions for rendering said three-dimensional models of the components of the selected article of clothing into two-dimensional images of said components of the selected article of clothing, such that the two-dimensional images of the components of the selected article of clothing reflects the texture, color, opacity and bump maps of the three-dimensional models of the components of the selected article of clothing. Furthermore, in this embodiment, the instructions for assembling includes instructions for assembling the two-dimensional images of the components of the selected article of clothing as specified by the component assembly order information on the image of the person.

In yet another embodiment, a computer-implemented process of generating a two dimensional image of a selected article of clothing superimposed at a location on a two-dimensional image of a person using a computer network including at least a server and a client computer. The process includes: (1) retrieving a two-dimensional image of the person from a database; (2) obtaining user's picture three-dimensional clothing parameters associated with the person, the user's picture three-dimensional clothing parameters specifies at least the location of a generic article of clothing on the image of the person; (3) obtaining a component breakdown scheme, the component breakdown scheme specifies a manner in which the generic article of clothing is dismembered into components of the generic article of clothing; (4) obtaining hidden area information, the hidden area information specifies the area of the three-dimensional model of the generic article of clothing that is hidden from view when the three-dimensional model of the generic article of clothing is superimposed at the location on the image of the person; (5) manipulating using at least one the server and the client computer the three dimensional model of the selected article of clothing according to the user's picture three-dimensional clothing parameters such that the selected article of clothing is positioned at the location on the image of the person; (6) dismembering the three-dimensional model of the selected article of clothing into three-dimensional models of components of the selected article of clothing as specified by the breakdown scheme; (7) converting the three-dimensional models of the components of the selected article of clothing into a two-dimensional images of the components of the selected article of clothing; (8) modifying at least one of the two-dimensional images of the components of the selected article of clothing as specified by the hidden area information such that the hidden area identified in the hidden area information for the generic article of clothing are correlated to the two-dimensional images of the selected article of clothing and removed; and (9) assembling the two-dimensional images of the components of the selected article of clothing on the image of the person and thereby generating a two-dimensional image of the article of clothing on the image of the person.

In yet another embodiment, the present invention provides a computer-implemented process of generating a two dimensional image of a selected article of clothing superimposed at a location on a two dimensional image of a person using a computer network including at least one of a server and a computer. The process includes: (1) creating a three-dimensional model of the selected article of clothing; (2) creating a three-dimensional model of a generic article of clothing; (3) dividing a three-dimensional angle space of the three-dimensional model of the generic article of clothing into three-dimensional sectors; (4) determining a component breakdown scheme for each three-dimensional sector of the three-dimensional model of the generic article of clothing, the component breakdown scheme specifies a manner in which the three-dimensional model of the generic article of clothing is dismembered into components of the generic article of clothing; (5) obtaining a two-dimensional image of the person from a database; (6) manipulating the three-dimensional model of the generic article of clothing such that the article of clothing is positioned at the location on the image of the person; (7) storing the location in a memory storage area; (8) manipulating the three dimensional model of the selected article of clothing such that the selected article of clothing is positioned at the location on the image of the person; (9) dismembering the three-dimensional model of the selected article of clothing into three-dimensional models of components of the selected article of clothing as specified by the breakdown scheme of the generic article of clothing; (10) converting the three-dimensional models of the components of the selected article of clothing into a two-dimensional images of the components of the selected article of clothing; and (11) assembling the two-dimensional images of the components of the selected article of clothing on the image of the person and thereby generating a two-dimensional image of the article of clothing on the image of the person.

The step of determining a component breakdown scheme may further include providing an hidden area instruction, which defines on a user's picture that includes the image of the person using at least one the server and the client computer an area of the three-dimensional model of the generic article of clothing that is hidden from view when the three-dimensional model of the generic article of clothing is superimposed at the location on the image of the person.

The present invention provides a significant improvement over the prior art approaches of generating a two-dimensional image of an article of clothing superimposed on an image of a person. By way of example, the present invention's ability to deal with the presence of an extraneous object on the image of a person and feature of warping the article of clothing offers the advantage of realistically depicting the article of clothing superimposed on the image of a person. As another example, the present invention dismembers the three-dimensional model of article of clothing into its three-dimensional models of components, which are converted to two-dimensional rendered images. The two-dimensional rendered images quickly combine with the two-dimensional user's picture to produce the two-dimensional image of FIG. 2B. Furthermore, the memory space required for storing two-dimensional images is less than the memory space required for storing three-dimensional models. Thus, the advantages of the present invention facilitate in quickly producing a realistic effect of a person wearing an article of clothing in a two-dimensional image that is not accomplished by the prior art systems and methods.

These and other features of the present invention will be described in more detail below in the detailed description of the invention and in conjunction with the following figures.

BRIEF DESCRIPTION OF THE DRAWINGS

FIG. 13A shows a rendered image of a left temple component of eye-glasses selected by a user.

FIG. 13B shows the rendered image of the left temple component of FIG. 13A that has been modified according to step 214 of FIG. 6A.

FIG. 14A shows a rendered image of a left lens component of the eye-glasses selected by a user.

FIG. 14B shows the rendered image of the left lens component of FIG. 14A that has been modified according to step 214 of FIG. 6A.

FIG. 15 shows a rendered image of a bridge component of the eye-glasses selected by a user.

DETAILED DESCRIPTION OF PREFERRED EMBODIMENTS

Figure 1:
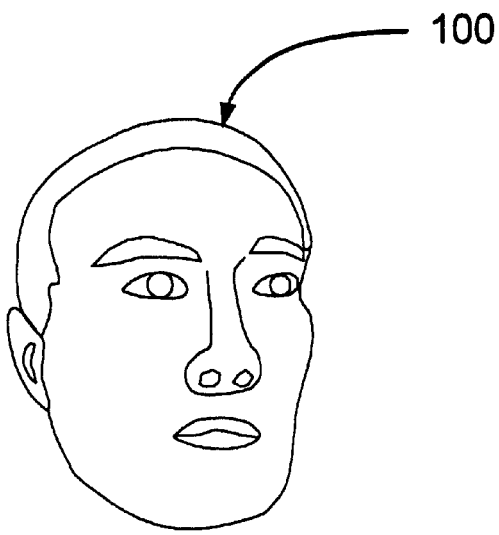
FIG. 1 shows a frontal view of an image of a person's face looking at an angle to the person's left.

The present invention provides systems and methods that effectively use a two-dimensional image of a person and a three-dimensional image of an article of clothing to quickly and precisely generate a two-dimensional image of the article of clothing superimposed on the image of a person. In the following description numerous specific details are set forth in order to provide a thorough understanding of the present invention. It will be apparent, however, to one skilled in the art that the present invention may be practiced without limitation to some or all of these specific details. In other instances, well known process steps have not been described in detail in order to not unnecessarily obscure the invention. By way of example, the term "user picture," used throughout the description of this invention, is not limited to a picture of a user, but also refers to a picture of another person who the user wishes to see wearing an article of clothing of the user's choice.

The present invention provides the advantages of both approaches described above, without suffering from their drawbacks. In other words, the present invention, like the first approach, offers the advantage of precisely depicting the article of clothing superimposed on the image of a human being and like the second approach, offers the advantage of quickly generating such an image.

The present invention effectively captures in its resulting two-dimensional image a "natural" look realized due to different properties associated with articles of clothing. The present invention also effectively deals with the presence of an extraneous object located on the image of the person where the image of the article of clothing is subsequently superimposed and, therefore, depicts the article of clothing placed on the person in its normal or typical position. These advantages of the present invention facilitate in producing a photo realistic effect of a person wearing an article of clothing in a two-dimensional image that is not accomplished by the prior art systems and approaches.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, creating, dividing, storing, manipulating, marking, removing, assembling, executing, or downloading. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 3:
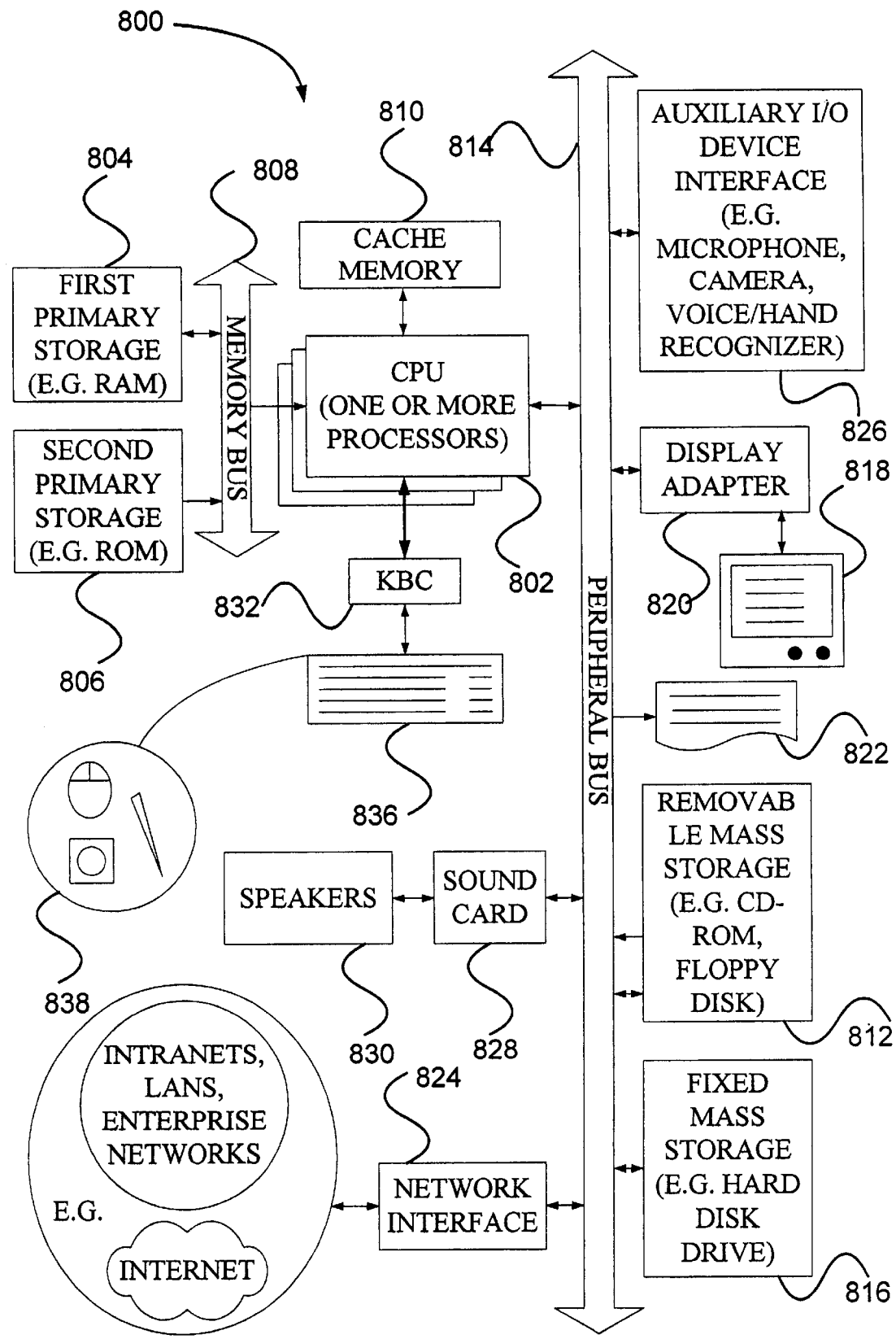
FIG. 3 is a schematic illustration of a general purpose computer system suitable for implementing the present invention.

FIG. 3 is a block diagram of a general purpose computer system 800 suitable for carrying out the processing in accordance with one embodiment of the present invention. FIG. 3 illustrates one embodiment of a general purpose computer system. Other computer system architectures and configurations can be used for carrying out the processing of the present invention. Computer system 800, made up of various subsystems described below, includes at least one microprocessor subsystem (also referred to as a central processing unit, or CPU) 802. That is, CPU 802 can be implemented by a single-chip processor or by multiple processors. CPU 802 is a general purpose digital processor which controls the operation of the computer system 800. Using instructions retrieved from memory, the CPU 802 controls the reception and manipulation of input data, and the output and display of data on output devices.

CPU 802 is coupled bi-directionally with a first primary storage 804, typically a random access memory (RAM), and uni-directionally with a second primary storage area 806, typically a read-only memory (ROM), via a memory bus 808. As is well known in the art, primary storage 804 can be used as a general storage area and as scratch-pad memory, and can also be used to store input data and processed data. It can also store programming instructions and data, in the form of data objects, text objects, data constructs, databases, message stores, etc., in addition to other data and instructions for processes operating on CPU 802, and is used typically used for fast transfer of data and instructions in a bi-directional manner over the memory bus 808. Also as well known in the art, primary storage 806 typically includes basic operating instructions, program code, data and objects used by the CPU 802 to perform its functions. Primary storage devices 804 and 806 may include any suitable computer-readable storage media, described below, depending on whether, for example, data access needs to be bi-directional or uni-directional. CPU 802 can also directly and very rapidly retrieve and store frequently needed data in a cache memory 810.

A removable mass storage device 812 provides additional data storage capacity for the computer system 800, and is coupled either bi-directionally or uni-directionally to CPU 802 via a peripheral bus 814. For example, a specific removable mass storage device commonly known as a CD-ROM typically passes data uni-directionally to the CPU 802, whereas a floppy disk can pass data bi-directionally to the CPU 802. Storage 812 may also include computer-readable media such as magnetic tape, flash memory, signals embodied on a carrier wave, PC-CARDS, portable mass storage devices, holographic storage devices, and other storage devices. A fixed mass storage 816 also provides additional data storage capacity and is coupled bi-directionally to CPU 802 via peripheral bus 814. The most common example of mass storage 816 is a hard disk drive. Generally, access to these media is slower than access to primary storages 804 and 806. Mass storage 812 and 816 generally store additional programming instructions, data, and the like that typically are not in active use by the CPU 802. It will be appreciated that the information retained within mass storage 812 and 816 may be incorporated, if needed, in standard fashion as part of primary storage 804 (e.g. RAM) as virtual memory.

In addition to providing CPU 802 access to storage subsystems, the peripheral bus 814 is used to provide access to other subsystems and devices as well. In the described embodiment, these include a display monitor 818 and adapter 820, a printer device 822, a network interface 824, an auxiliary input/output device interface 826, a sound card 828 and speakers 830, and other subsystems as needed.

The network interface 824 allows CPU 802 to be coupled to another computer, computer network, or telecommunications network using a network connection as shown. Through the network interface 824, it is contemplated that the CPU 802 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 802 can be used to connect the computer system 800 to an external network and transfer data according to standard protocols. That is, method embodiments of the present invention may execute solely upon CPU 802, or may be performed across a network such as the Internet, intranet networks, or local area networks, in conjunction with a remote CPU that shares a portion of the processing. Additional mass storage devices (not shown) may also be connected to CPU 802 through network interface 824.

Auxiliary I/O device interface 826 represents general and customized interfaces that allow the CPU 802 to send and, more typically, receive data from other devices such as touch-sensitive displays, transducer card readers, tape readers, voice or handwriting recognizers, biometrics readers, cameras, portable mass storage devices, and other computers.

Also coupled to the CPU 802 is a keyboard controller 832 via a local bus 834 for receiving input from a keyboard 836 or a pointer device 838, and sending decoded symbols from the keyboard 836 or pointer device 838 to the CPU 802. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 808, peripheral bus 814, and local bus 834 are illustrative of any interconnection scheme serving to link the subsystems. For example, a local bus could be used to connect the CPU to fixed mass storage 816 and display adapter 820. The computer system shown in FIG. 3 is but an example of a computer system suitable for use with the invention. Other computer architectures having different configurations of subsystems may also be utilized.

Figure 4:
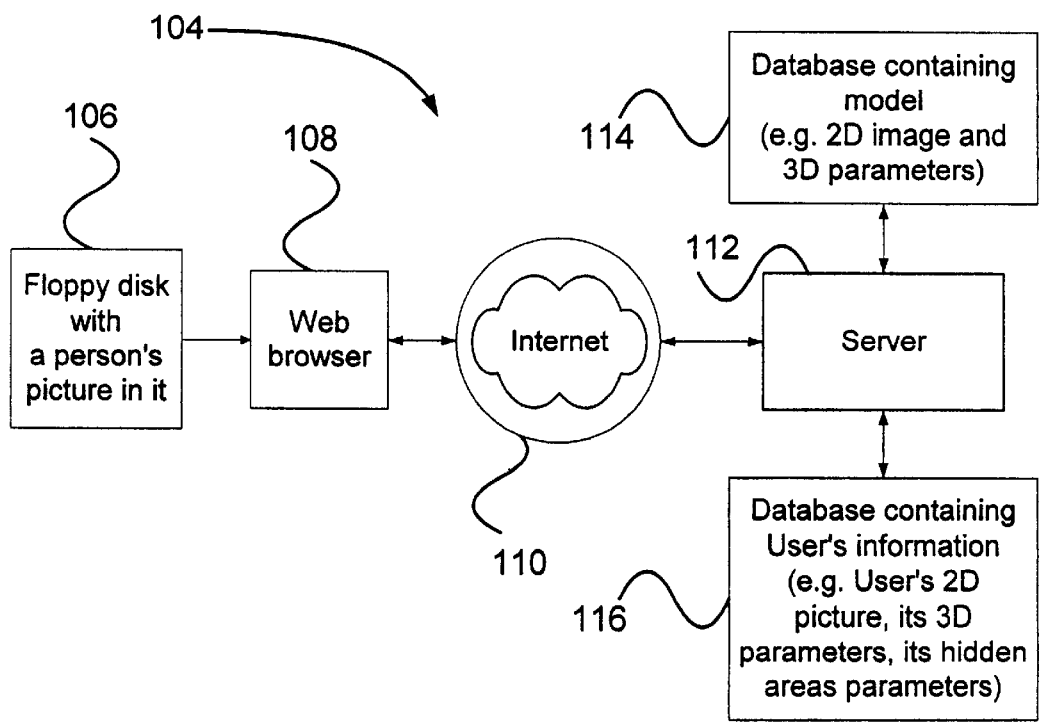
FIG. 4 shows a schematic illustration of a system, according to one embodiment of the present invention, that generates over the Internet the two-dimensional image of FIG. 2B.
Figure 5:
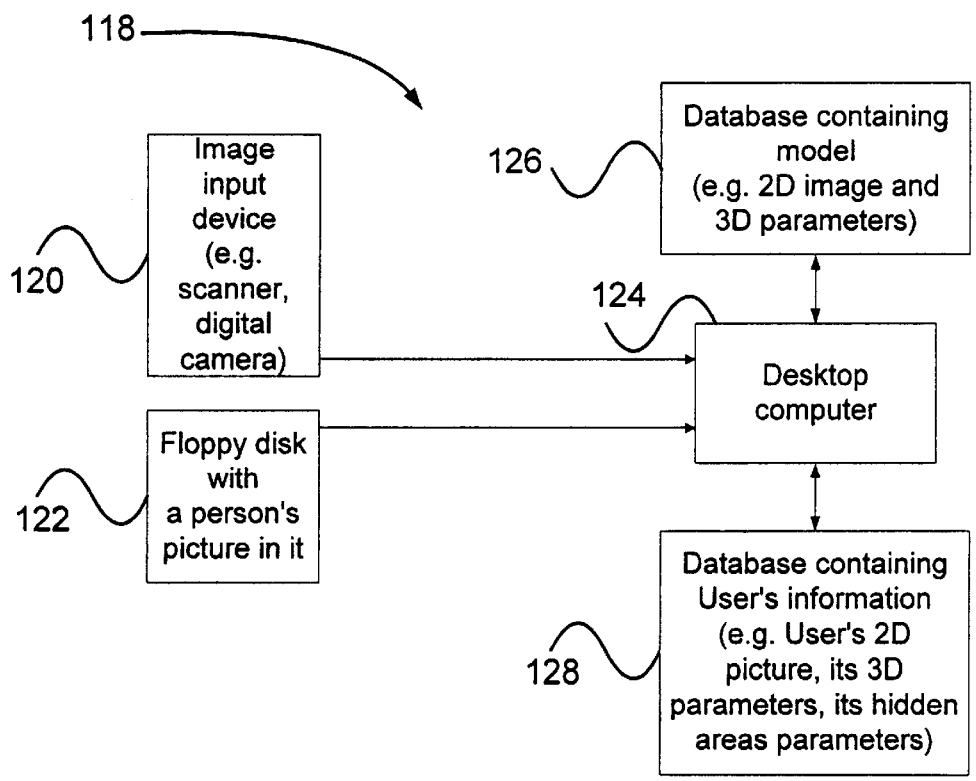
FIG. 5 shows a schematic illustration of a system, according to one embodiment of the present invention, that employs a stand-alone computer (not connected to a network) and generates the two-dimensional image of FIG. 2B.

In one embodiment, at least some of the steps of the present invention may reside in a networked environment and, therefore, may run on any one of several computers that are connected to the network. By way of example, at least some of the steps of the present invention may be implemented using the Internet, as shown in FIG. 4. In an another embodiment, at least some of the steps of the present invention may be implemented using a commercially available CD-ROM, as shown in FIG. 5.

FIG. 4 shows a system 104, according to one embodiment of the present invention, that generates a two-dimensional image of the article of clothing superimposed on the image of a person over the Internet. System 104 is an illustrative relationship between a World Wide Web (hereinafter referred to as "Web") server 112, which is also known as the Internet server, and a stand-alone client 108 running a browser program allowing access to the Internet 110. Stand alone client 108 can be any type of general purpose computer with a monitor and memory that may be supplied with a data of the user's picture on a floppy disk 106, for example. As explained later, in other embodiments of the present invention, the user picture may be supplied to an operator.

Web server 112 is connected to the Internet 110 via a communication link, such as a telephone line and is typically a node on a private network (not shown to simplify illustration). Web server 112 may be a general purpose network computer or a computer specially configured to act solely as a Web server. In other preferred embodiments of the present invention, a two-dimensional image of the article of clothing superimposed on the image of a person can be similarly depicted over other networks, intranets or enterprise networks, for example.

Web server 112 has memory storage areas 114 and 116. Memory storage area 114 (also referred to as the models database) may store information, such as a two-dimensional image of an article of clothing, a three-dimensional model of the article of clothing and the three-dimensional parameters associated therewith, a two-dimensional image and three-dimensional model of a generic article of clothing. The two-dimensional image of an article of clothing may be a high quality image that would appear in a catalogue, with or without a human model wearing it. The models of the generic article and articles of clothing may be stored in the models database in any familiar three-dimensional format well known to those skilled in the art, e.g., 3DS, which is commercially available from Kinetix (a division of Autodesk, Inc.,) San Francisco, Calif., DXF, which is commercially available from Autodesk, San Rafael, Calif., and SAT, which is commercially available from Spatial Technology of Boulder, Colo.

Furthermore, as will be explained later in detail, the three-dimensional sectors and component breakdown scheme associated with each article of clothing selected by the user and the "hidden area" instructions and the component assembly order associated with the generic article of clothing are also stored in memory storage area 114. In a "hidden area" certain part(s) of the three-dimensional model of article of clothing are hidden, when the article of clothing is superimposed on the image of a human being. In other words, a picture of a person may contain areas that in the "real world" hide parts of the three-dimensional model of article of clothing. By way of example, the head of a person may hide parts of a hat that is placed on the person's head.

Memory storage area 116 (also referred to as the user's picture database) contains several types of information. By way of example, it may contain user details, such as name, login, password and other pertinent details regarding the user. As another example, it may also have stored therein one or more pictures of the user or another person and the user may have a way to refer to each stored picture by name, index, etc.

Each picture stored in memory storage area 116 has several parameters (hereinafter referred to as "user's picture three-dimensional clothing parameters") associated with it that describe the appropriate, natural position of the generic article of clothing when it is superimposed on the image of the person (in the user's picture). By way of example, the user's picture three-dimensional clothing parameters that are stored in memory storage area 116 include translation, rotation, scaling factor, and warping of the generic article of clothing. In one embodiment of the present invention, the values of these parameters are arrived at after an operator manually adjusts the three-dimensional model of the generic article of clothing on the user's picture.

Memory storage area 116 has also stored thereon user's picture with marked-up "hidden areas," which may be drawn according to the hidden areas instructions stored in the models database. Each hidden area drawn on the user's picture may be described as a closed polygonal shape that is represented in the database as a sequence of points (X, Y coordinates). Each picture may contain none or at least one such hidden area. As explained below, in one embodiment of the present invention, the operator may draw and store in the user's picture database these hidden areas in association with a specific user's picture.

FIG. 5 shows a system 118, according to an alternative embodiment of the present invention, that generates a two-dimensional image of the article of clothing superimposed on the image of a person over a stand-alone computer 124 that is not connected to a network. A user picture stored in a floppy disk 122 or another suitable storage device is supplied to stand-alone computer 124, or alternatively the user picture in a photograph, for example, is scanned by a scanner 120 and supplied to stand-alone computer 124. A compact disc-ROM (CD-ROM) 126 containing the models database described above supplies the necessary two-dimensional and a three dimensional images of articles of clothing and the parameters associated with the three-dimensional image to the stand-alone computer 124. A memory storage area 128 in the hard drive of stand-alone computer 124 serves as the user's information database described above.

Figure 6A:
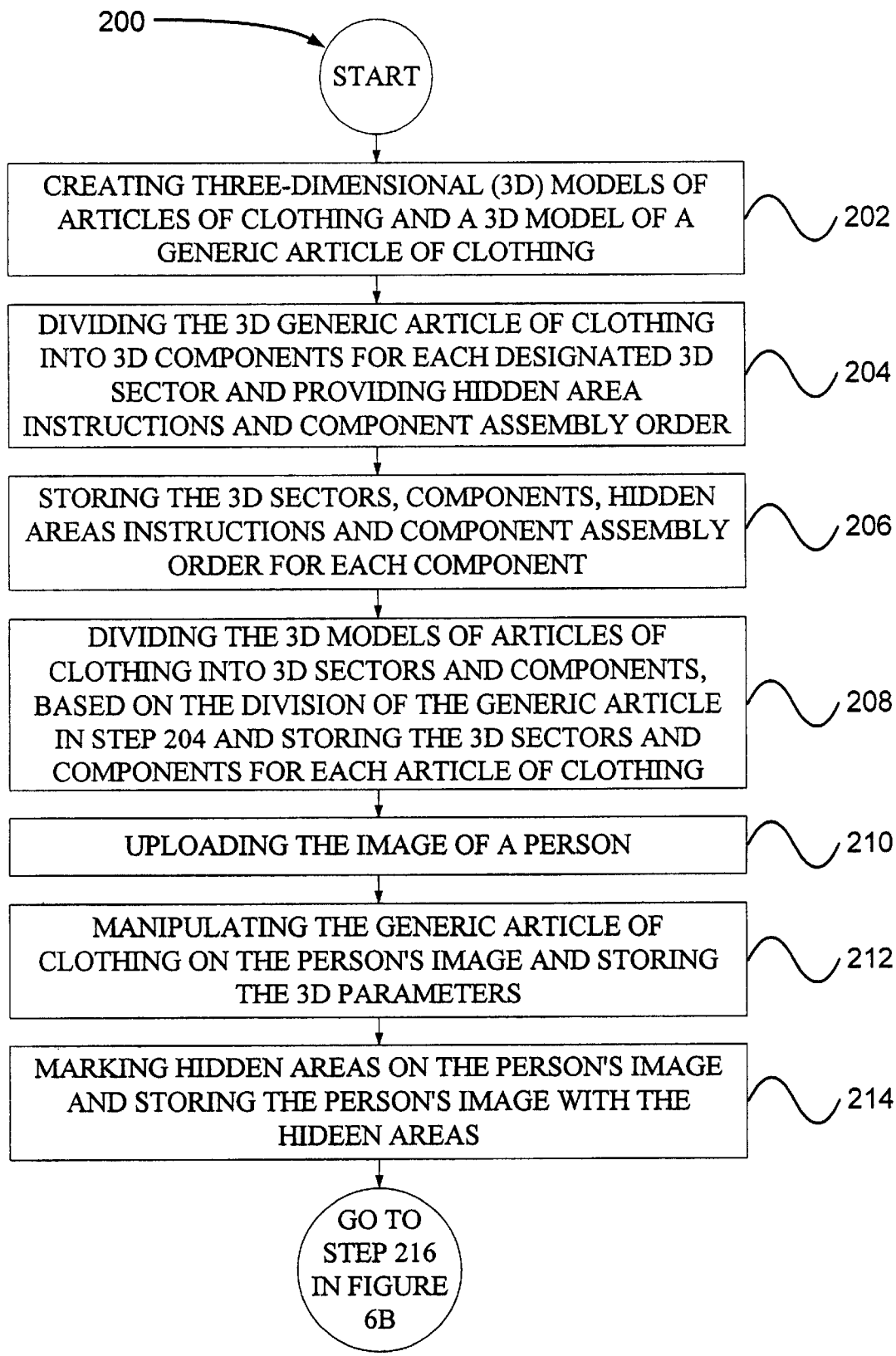
FIGS. 6A and 6B is a flowchart of a process, according to one embodiment of the present invention, of generating the two-dimensional image of FIG. 2B.
Figure 6B:
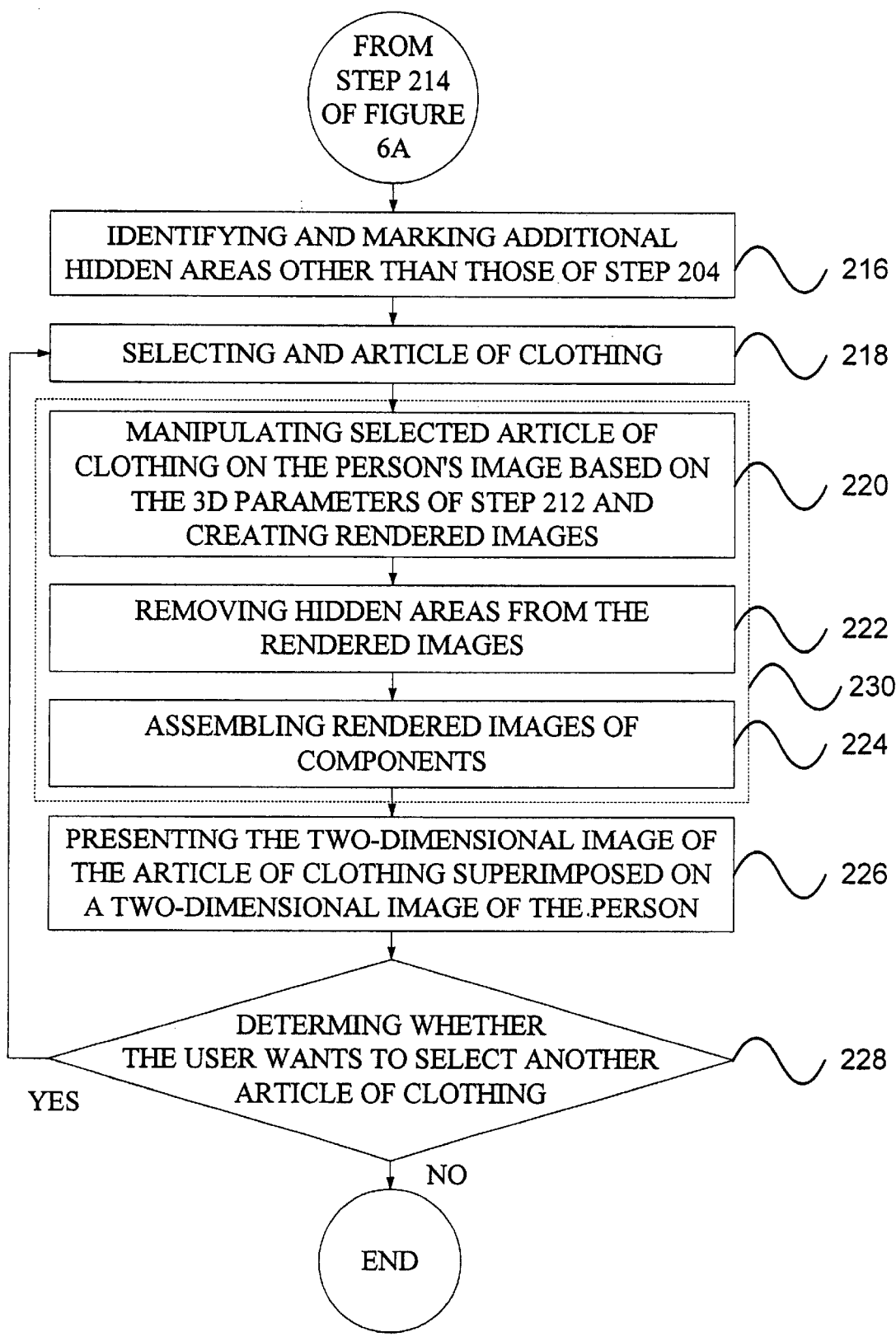

FIGS. 6A and 6B show a flowchart of a process 200, according to one embodiment of the present invention, for generating a two-dimensional image of an article of clothing superimposed on an image of a person. Process 200 may begin with a step 202 when three-dimensional models of articles of clothing and a three-dimensional model of a generic article of clothing are created. The three-dimensional models of articles of clothing are converted to two-dimensional images, which serve as a catalogue of prespecified articles of clothing. A user may select an article of clothing from the above-mentioned catalogue so that he/she may see his/her choice of article of clothing superimposed on an image of a person. The "generic" article of clothing refers to an article of clothing that is representative of the prespecified articles of clothing. By way of example, a pair of eye-glasses shown in FIG. 8 may be representative of all the pair of eye-glasses shown in a catalogue or FIG. 7.

In one embodiment, step 202 is performed by a graphic designer, who at a graphic design station creates both the prespecified and generic articles of clothing using a standard three-dimensional format employing such applications as 3D studio MAX 2.0, which is commercially available from Kinetix (a division of Autodesk, Inc.) of San Francisco, Calif., Lightwave 5.0, which is commercially available from NewTek of San Antonio, Tex., NuGraf, which is commercially available from Okino Computer Graphics of Mississauga, Ontario, Canada. The three-dimensional models created using the above-mentioned applications may have a wireframe structure appearance.

In this step, a graphic designer may start from scratch or from an existing three-dimensional model of an article of clothing and then modify the model to be a generic representative of the article of clothing. In another embodiment, the graphic designer designates one of the three-dimensional models of the articles of clothing from the catalogue as a generic article of clothing. Regardless of how it is created, the generic article of clothing is saved in this step by a graphic designer in the models database.

In a step 204, based on the type of article of clothing and complexity, the graphic designer divides three-dimensional angle space into three-dimensional sectors (defined by a range of alpha, beta and gamma angles around the X, Y, and Z axis, respectively. For each of these three-dimensional sectors, the graphic designer divides the article of clothing into components, provides hidden area instructions and an order of assembly for each divided component. In this step, within each three-dimensional sector the graphic designer may divide at least a portion of the generic article of clothing into its various components and then identify those component(s) that have at least some portion that is hidden when the article of clothing is superimposed on an imaginary person or mannequin, for example. Next, in a step 206, the range of angles that define the three-dimensional sectors, the divided components within each sector, hidden area instructions and assembly order for each component is stored in the models database.

A step 208 includes dividing the three-dimensional models of articles of clothing into their various three-dimensional sectors in a manner that is substantially similar to the division of the generic article of clothing into its three-dimensional sectors as described in step 204. According to one embodiment of the present invention, therefore, the ranges of alpha, beta and gamma angles that define the three-dimensional sectors for the various articles of clothing are substantially similar to the ranges of alpha, beta and gamma angles that define the three-dimensional sectors for the generic article of clothing. In step 208, these ranges of alpha, beta and gamma angles are associated with each article of clothing and stored in the models database.

Furthermore, within each three-dimensional sector, the component breakdown scheme of each article of clothing is the same as the component breakdown scheme of the generic article of clothing determined in step 204 and stored in the models database. It is important to note that, in this step, unlike the data of three-dimensional sectors and the component breakdown scheme, the hidden area instructions and component assembly order need not be stored with each article of clothing. Rather, the hidden area instructions and the component assembly order are associated with the generic article of and stored in the models database.

A step 210 includes uploading a user's picture that contains an image of a person. In subsequent steps of process 200, the image of a person serves as the background upon which the image of an article of clothing will ultimately be superimposed. The user may use an already scanned image that is on the hard drive, or elect to take his/her or another's photograph using a digital camera. Regardless of how the picture is obtained, the image file may be transferred to the user's picture database, in system 104 of FIG. 4, for example, using transfer mechanisms like ftp, web browser file upload, etc., well known to those skilled in the art. In system 118 of FIG. 5, for example, the picture of a person may be taken by a regular or digital camera, scanned into a computer system and/or saved on the computer system's hard drive. Alternatively, in another embodiment of the present invention, the picture of the person stored in a floppy disk is uploaded on the computer system and/or saved on the computer system's hard drive.

It should be borne in mind that the position of the person in the picture may be of any angle, distance, with or without a specific background, and with or without other people or objects in the picture. As will be evident by the description of this invention, the present invention provides a natural looking image of an article of clothing superimposed on the image of the person having any angle, distance, with or without a specific background and with or without a specific background, and with or without other people or objects in the picture. This is one advantage among many, however, that is not provided by the currently known approaches in the prior art.

Next, a step 212 includes manipulating the three-dimensional model of the generic article of clothing on the user's picture (which was uploaded in step 210) to arrive at and store the user's picture three-dimensional clothing parameters mentioned above. Manipulating the generic article of clothing includes translation, rotation, scaling, and warping of the three-dimensional model of the generic article on the image of the person so that the generic article of clothing "fits" onto the image of the person. In other words, the position and size of the generic article of clothing relative to the image of a person is manipulated such that it appears that the person is actually wearing the generic article of clothing.

The translational movement of the three-dimensional model of the generic article of clothing from an arbitrary point of origin may be expressed as integers (pixels) in the range that covers the dimensions of the user picture and in terms of X and Y coordinates, e.g., −width/2, +width/2, −height/2, +height/2. The rotational movement of the generic article of clothing from the arbitrary point of origin may be expressed as alpha, beta, gamma angles, which may be integers in the range of between about −180 and about +180. An alpha angle provides a measure of angular movement of the generic article of clothing with respect the X-axis, a beta angle provides a measure of angular movement with respect to the Y-axis and a gamma angle provides a measure of angular movement with respect to the Z-axis, for example. The scaling factors of the three-dimensional generic article of clothing may be expressed as a double (float) number in a range that is between about 0.01 and about 10, for example, where 1 may represent the nominal generic model size.

In one embodiment, step 212 is carried out manually by an operator, who moves the three-dimensional model of the generic article of clothing in the X-Y directions, rotates, scales, and/or warps the three-dimensional model of the generic article of clothing, as described above, relative to a specific user's picture. The visualization application, which allow the operator to manually adjust the three-dimensional model of the generic article of clothing on a specific user's picture may be written in any language, such as C++, Visual Basic, Java, etc., that is well known to those skilled in the art, with the use of a commercially available three-dimensional library such as, Java 3D API, which is commercially available from Sun Microsystems of Palo Alto, Calif. and InWorldVR, which is commercially available from SpaceCrafter of Sausalito, Calif. After the operator has concluded manipulating the three-dimensional model of the generic article of clothing, as described above, the appropriate user's picture three-dimensional clothing parameters, which are associated with the specific user's picture, may be stored in the user's picture database.

In system 104 of FIG. 4, Java™ applet, for example, or a plug-in that uses 3D API mentioned above within the web browser in stand-alone client 108 allows the operator to move the three-dimensional model of the generic article of clothing in the X and Y directions, rotate, scale and warp the generic article of clothing on the user's picture. As a result of this manipulation, the operator arrives at the appropriate user's picture three-dimensional clothing parameters, which are then stored in Web server 112 at user's picture database 116. In system 118 of FIG. 5, a program written in VC++ or VB that uses 3D API mentioned above in stand-alone computer 124 allows the operator to move the three-dimensional model of the generic article of clothing in the X and Y directions, rotate, scale and warp the generic article of clothing on the user's picture. The user's picture three-dimensional clothing parameters are then stored in the hard drive of stand-alone computer 124 at user's picture database 128.

A step 214 includes marking hidden areas on the image of a person and then storing the marked-up image of a person on the user's picture database. The hidden areas, as described above, refer to those areas of the generic article of clothing that may not be seen by a user because some part of the image of a person obstructs the user's view. In one embodiment, in step 214, an operator, through a potential guidance of a marking application, which may be written in such languages as C++, Visual Basic, Java, etc., draws areas (referred to as "hidden areas") on the user's picture based on the hidden area instructions provided by the graphic designer in step 204 and stored in step 206. The hidden areas may be represented by a closed polygon, for example, that is defined by X and Y coordinates. For each closed polygon, the X and Y coordinates may be stored in the user picture database in association with a specific user's picture. The hidden areas drawn on the image of a person activate a hidden area algorithm in a subsequent step to remove hidden areas from an article of clothing that is selected by the user.

In system 104 of FIG. 4, Java™ applet, for example, or a plug-in that uses 2D drawing API within the web browser in stand-alone client 108 allows the operator to draw hidden areas on the user's picture. The operator then sends the line segment information to Web server 112, where it is stored at user's picture database 116. In system 118 of FIG. 5, a program written in VC++ or VB that uses 2D drawing API in stand-alone computer 124 allows the operator to draw on the user's picture. The operator then sends the line segment information to the hard drive of stand-alone computer 124, where it is stored at user's picture database 128.

Referring to FIG. 6B, where process 200 continues with an optional step 216, which includes marking additional areas on the user's picture. According to one embodiment, in step 216, the operator identifies and marks additional hidden areas on the user's picture that account for the presence of an extraneous object, e.g., the person's hand or another person in the user's picture. The extraneous object may be located on the person's image where an article of clothing is subsequently superimposed. Therefore, by marking additional hidden areas, as will be explained later, a hidden area algorithm is activated at that location to delete the appropriate portions of a selected article of clothing.

It is important to bear in mind that the hidden areas marked in this step are different from those hidden areas that were identified by the graphic designer in step 204 and marked on the user's picture by the operator in step 214. It should also be noted that the graphic designer, when providing the hidden area instructions in step 204, does not have the benefit of looking at a particular user's picture that includes the extraneous object. Of course, if the user's picture has no such extraneous object, the operator need not perform step 216 and process 200 proceeds to a step 218.

In step 218, the user may select an article of clothing that he/she wishes to see on his/her image or the image of another from the catalogue of two-dimensional images of various articles of clothing generated in step 202. In other words, the user selects a model or a particular design of article of clothing.

An automated process 230 of combining the selected article of clothing and the user's picture begins at a step 220, in which the three-dimensional model of the article of clothing that is selected is rotated, translated, scaled, warped, etc. based on the user's picture three-dimensional clothing parameters stored in the user information database in step 212. In other words, the selected three-dimensional model of the article of clothing is manipulated like the three-dimensional model of the generic article of clothing. Therefore, in this step, the selected article of clothing acquires the same position relative to the image of a person that was deemed appropriate by the operator when the operator manipulated the generic article of clothing on the user's picture in step 212.

In this step, after the position of the selected article of clothing relative to the image of a person is established, the appropriate three-dimensional sector that includes that location and the predetermined breakdown scheme of the selected article of clothing is also known. It is worthwhile to recall that in step 208, the three-dimensional articles of clothing were divided into their various components (for each three-dimensional sector) and this information was stored in models database. According to present invention, therefore, this step divides or breaks down the selected article of clothing into its various components substantially similarly as the generic article of clothing was divided or broken down into its various components in step 204.

In one embodiment of the present invention, a program written in VC++ or Visual Basic controls a rendering engine (e.g., 3D studio MAX 2.0, Lightwave 5.0, NuGraf, etc. mentioned above) and renders the three-dimensional models of the disintegrated or broken down components of the selected article of clothing into two-dimensional images in step 220. The term a "rendered three-dimensional model" of a component of an article of clothing, as used in connection with the description of this invention, refers to a two-dimensional image of that component.

A two dimensional rendered image, as described in the present invention, accounts for three-dimensional parameters, such as texture, color, opacity, bump maps, etc. so that the rendered image of a component is an accurate representation of the three-dimensional model of that component. By way of example, the rendered images of the disintegrated components of the selected article of clothing may be saved in an image format that preserves the alpha channel (i.e. relative transparency or opacity) of the component. Targa (.tga), which is well known to those skilled in the graphics art, is one such image format.

Next, in a step 222, the hidden areas are removed from the rendered image of disintegrated components of step 220. In this step, the rendered image(s) of disintegrated component (s), which were suspected to undergo hiding at least to some extent in step 214 and/or step 216 in the marked-up user's picture, are modified. A hidden area algorithm is activated, in this step, to precisely carry out the hidden areas removal from the rendered image of the suspected components based on the relatively crude markings or drawings of hidden areas in the user's picture of step 214 of FIG. 6A. The hidden areas are removed by making those areas of the component that need to be hidden filly transparent or alternatively by deleting the data for those areas. Consequently, a portion of the rendered image of a component that falls within or intersects the hidden area is made transparent or deleted. This step may be completely automatic and simple geometrical rules may be employed to decide which areas of the rendered image need to become fully transparent. By way of example, a program written in VC++ or Visual Basic that controls an image manipulation engine facilitates in carrying out step 222. The image manipulation engine includes such applications as Lead Tools 8.0, which is commercially available from Lead Technologies, Inc. of Charlotte, N.C. and Image Gear, which is commercially available from Accusoft Corporation, Westborough, Mass. At the end of step 222, a set of rendered three-dimensional images, one for each component of the selected article of clothing, having their hidden areas removed is produced. Of course, if a component of the selected article of clothing is not suspected to undergo hiding, then the rendered image of that component is not modified in this step.

In a step 224, using the user's picture as a background, the two-dimensional images of the components (of the selected article of clothing) are assembled according to the component assembly order specified for the generic article of clothing in step 206 and stored in the models database. By way of example, a program written in VC++ or Visual Basic that controls an image manipulation engine facilitates in carrying out step 224. The result of step 224 and automated process 230 is a two-dimensional image of the selected article of clothing superimposed on the image of the person (in the user's picture) and the two-dimensional image may be stored in any standard format like .bmp, gif, .jpg, etc. well known to those skilled in the art.

In a step 226, the two-dimensional image of the selected article of clothing superimposed on the image of a person resulting from step 224 is presented to the user. In system 104 of FIG. 4, the two-dimensional image resulting from step 224 is shown by the web browser program running on stand-alone client 108. The web browser program may receive the image from Web server 112 that created the two-dimensional image of step 224. In system 118 of FIG. 5, the two-dimensional image resulting from step 224 is shown on a screen of stand-alone computer 124 and the image may have been created by automated process 200.

In a step 228, it is determined whether the user wants to select another article of clothing. If it is established that the user does not want to select another article of clothing, then process 200 comes to an end. If, however, it is established that the user wants to select another article of clothing, then process 200 proceeds to step 218, where the user selects another article of clothing. Those skilled in the art will recognize that the process continues as described above, until it is established that the user does not want to select articles of clothing anymore.

Figure 7:
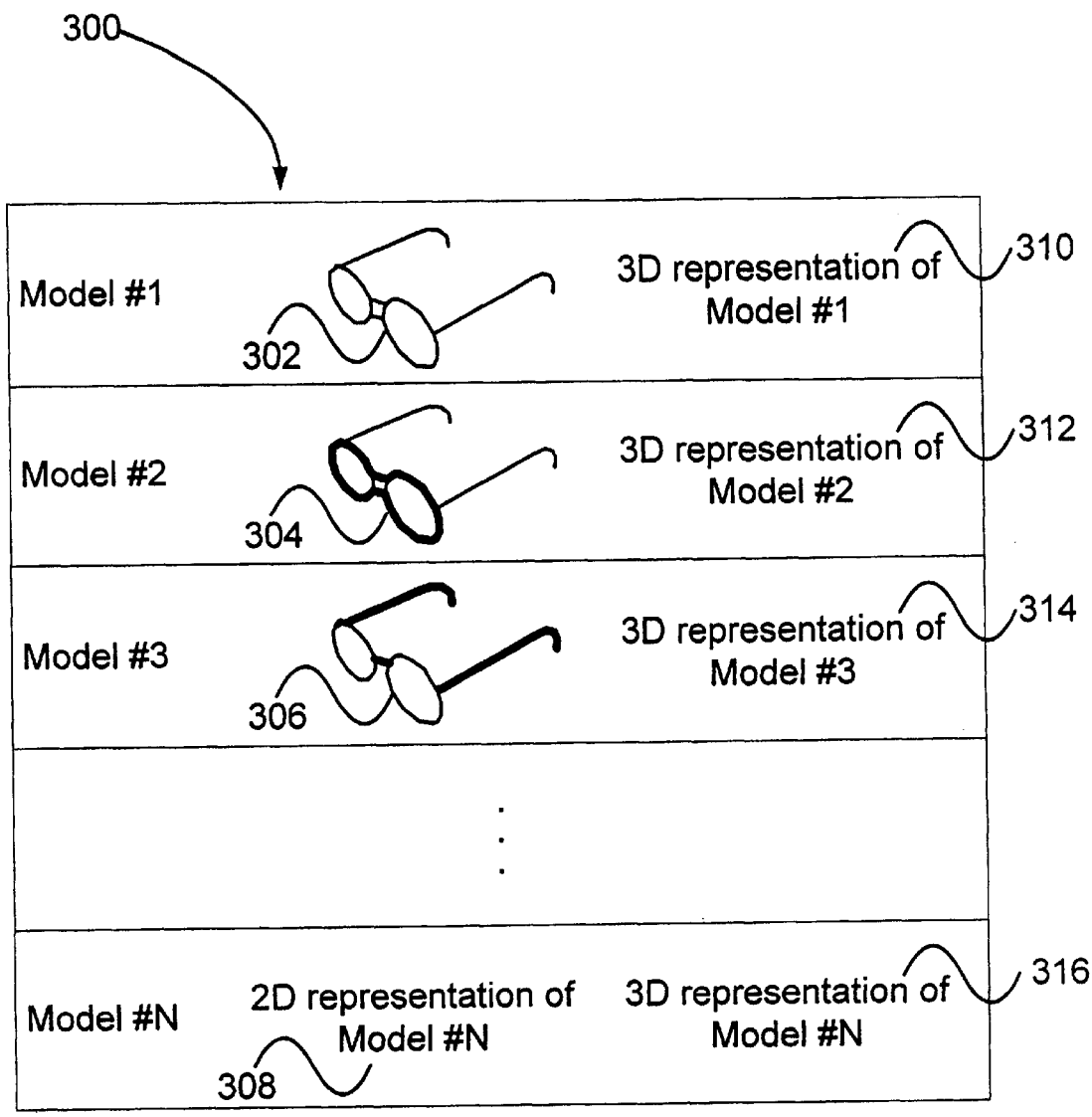
FIG. 7 is an illustration of data representation, according to one embodiment of the present invention, in a models database that may either reside in the system of FIG. 4 or system of FIG. 5.

FIG. 7 is an illustration of data representation in a models database 300, according to one embodiment of the present invention. As shown in this figure, models database 300 includes the data for N number of articles of clothing, where N represents the total number of different models or different designs of a particular type of article of clothing, e.g., eye-glasses, that a user may select. The data stored in models database 300 for these article of clothing defines the three-dimensional models 310, 312, 314 and 316 of these articles of clothing, which are created according to step 202 of FIG. 6A and saved in a format that accounts for texture, color, opacity, bump maps, etc., and/or the various components of the three-dimensional model. By way of example, the data for a lens of a pair of eye-glasses may include data for the degree of transparency through the lens. This allows the rendered image of the various components of an article of clothing to accurately reflect the properties of that component in step 220. Stated another way, by storing the texture, color, opacity, bump maps, etc., associated with each model, the present invention is able to produce the natural look of the resulting two-dimensional image of an article of clothing superimposed on an image of a person. As shown in FIG. 7, also stored in models database are two-dimensional images 302, 304, 306 and 308 that correspond to the three-dimensional models 310, 312, 314 and 316. The two-dimensional images 302, 304, 306 and 308 may form a catalogue, from which the user may select an article of clothing.

Figure 8:
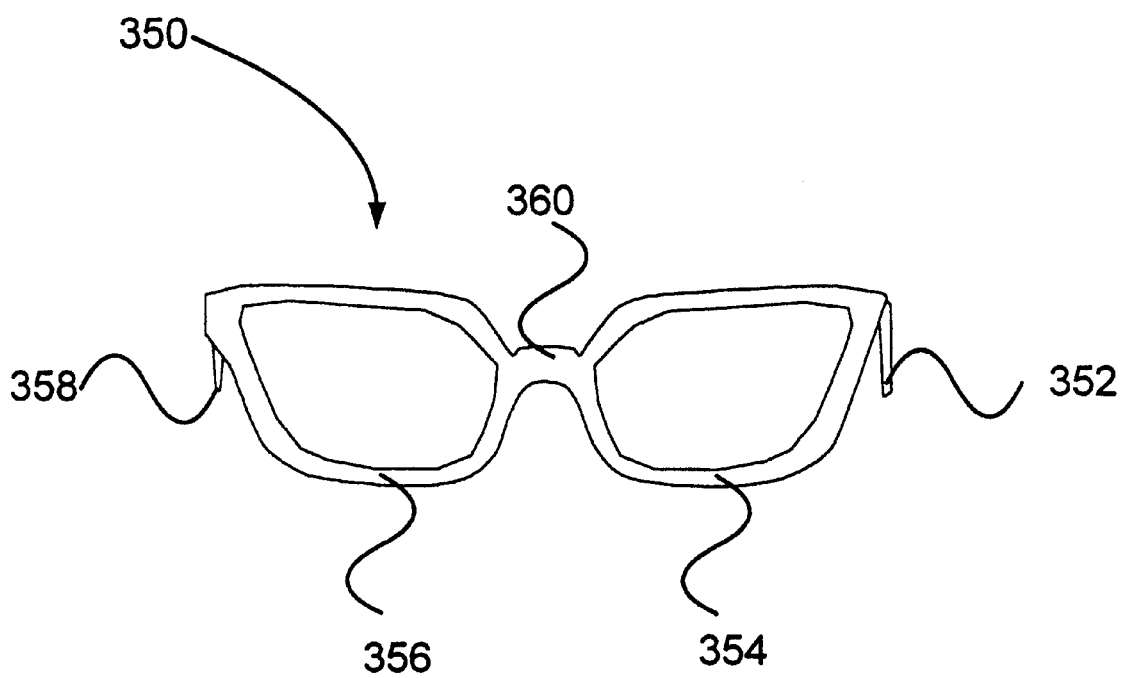
FIG. 8 shows a generic pair of eye-glasses with its components, according to one embodiment of the present invention.

FIG. 8 shows a generic pair of eye-glasses 350 that may be representative of the different models of eye-glasses, whose data is stored in models database 300. As mentioned above, the data for generic pair of eye-glasses 350 is also stored in models database 300 of FIG. 7. Generic pair of eye-glasses 350, as shown in FIG. 8, includes a left temple 352, a left lens 352, a right lens 354, a right temple 358 and a bridge 360. The three-dimensional model of generic pair of eye-glasses 350 may be created like the three-dimensional models and two-dimensional image of the various models of eye-glasses in the same step (i.e. step 202 of FIG. 6A) or in different steps.

Figure 9A:
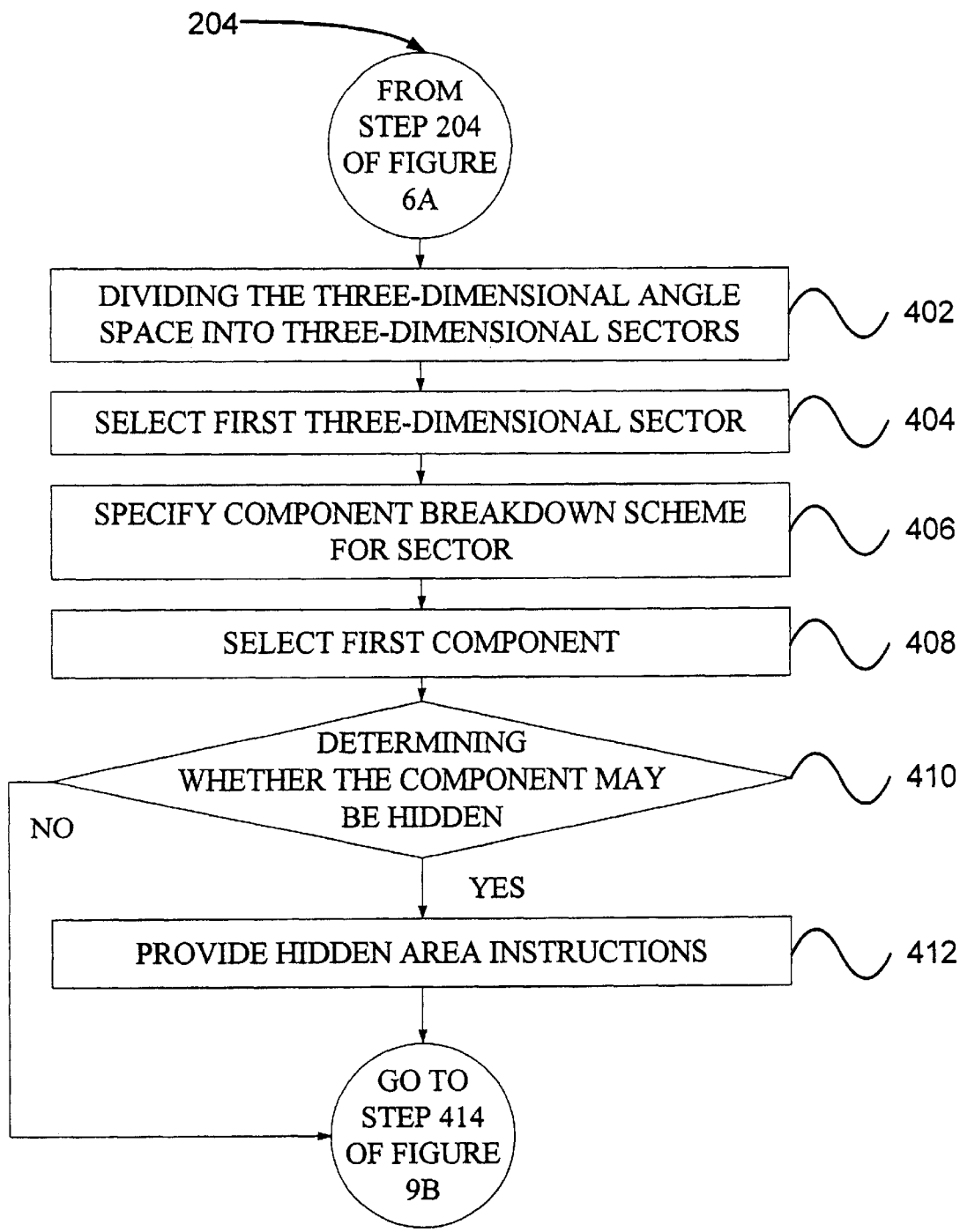
FIGS. 9A and 9B is a flowchart showing in further detail the steps, according to one embodiment of the present invention, taken to divide the generic article of clothing into components based on three-dimensional sectors, and provide hidden area instructions and component assembly order according to step 204 of FIG. 6A.
Figure 9B:
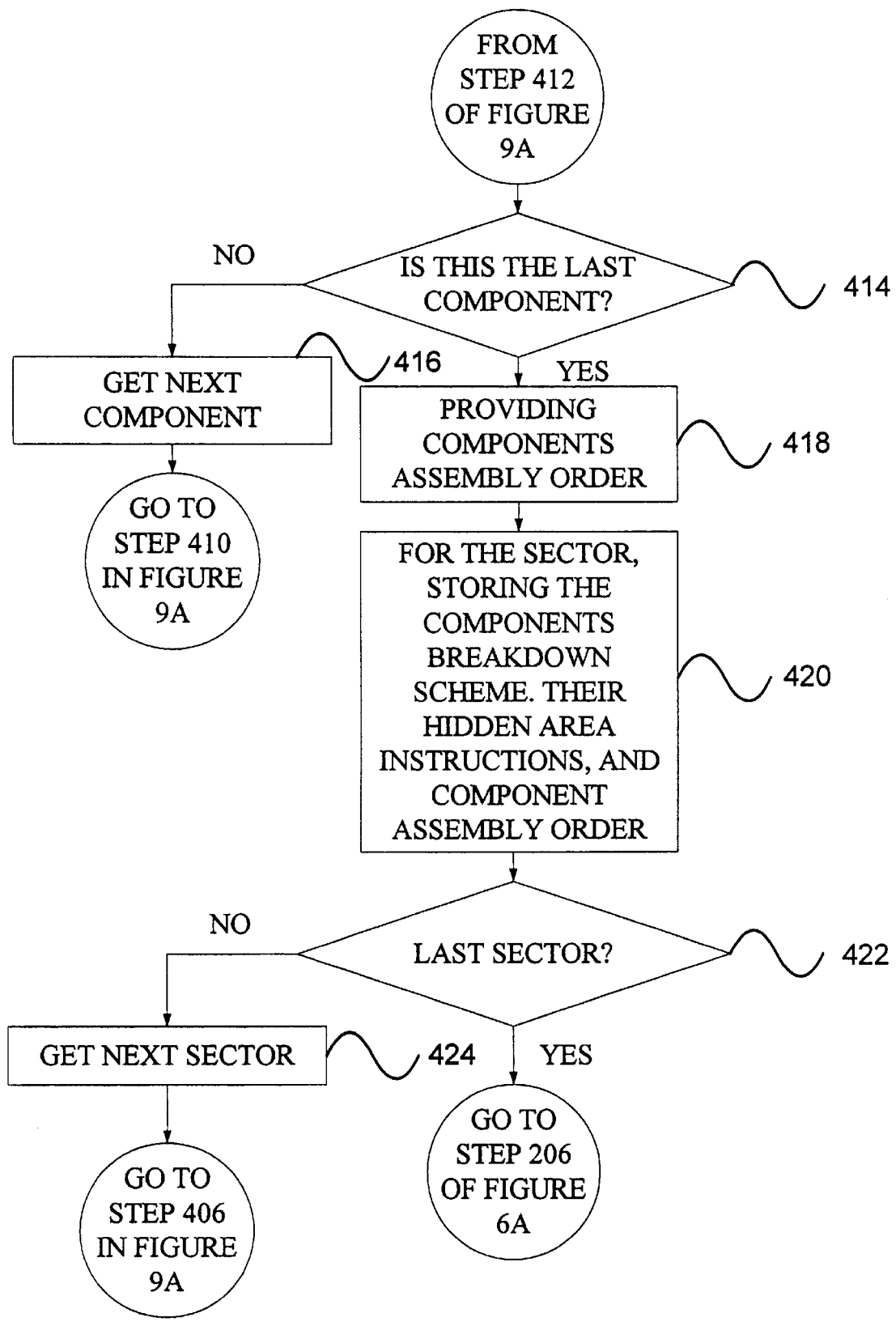

FIGS. 9A and 9B is a flowchart showing in further detail step 204 of FIG. 6A, according to one embodiment of the present invention. A step 402 includes dividing the three-dimensional angle space of the three-dimensional model of generic article of clothing into three-dimensional sectors. In one embodiment, this may be accomplished by rotating the generic article of clothing in a three-dimensional angle space and dividing the three-dimensional angle space into three-dimensional sectors, which are defined by boundaries of their angles, e.g., [[α1–α2], [β1–β2], [γ1–γ2]]. By way of example, in this step, the graphic designer may imagine generic pair of eye-glasses 350 positioned in their normal position on an imaginary person or a mannequin and rotate generic pair of eye-glasses 350.

Next, the first three-dimensional sector is selected in a step 404 and in a step 406 a component breakdown scheme for the first sector is specified. By way of example, the graphic designer imagines generic pair of eye-glasses 350 on a mannequin looking left at an angle and specifies that generic pair of eye-glasses 350 may be broken down into left and right lenses, left and right temples, bridge, as mentioned in Table 1. A first component, within the component breakdown scheme, is selected in step 408 and in step 410 it is determined whether the selected component is a suspect component, at least a portion of which may be hidden by a body part in the image of a person, for example. If it is determined that the component may not be hidden, then the process proceeds to a step 414 described below. If, however, it is determined that the component is suspected to be hidden, then the hidden area instructions are provided in a step 412. In one embodiment, the hidden area instructions for the suspect component are provided by the graphic designer.

In step 414, it is determined whether the component selected (in step 408 or a step 416) is the last component. If it is determined that the component selected is not the last component, another component from the component breakdown scheme is selected in step 416 and the process proceeds to step 410 mentioned above. If, however, it is determined that the component selected is the last component, then in a step 418 a components assembly order is provided (e.g., by the graphic designer).

In this step, the graphic designer provides an order in which the components will be later assembled on the image of the person. By way of example, for generic pair of eye-glasses 350 of FIG. 8, the graphic designer may provide the following hidden area instructions and component assembly order.

TABLE 1

| Three-dimensional sectors defined by ([α1–α2], [β1–β2], [γ1–γ2]) | Component | Hidden area instructions | Assembly order |
| --- | --- | --- | --- |
| [[−5, +5], [+5, +90], [−5, +5]] (person's head looking to the person's left) | Right temple | The area whose right side coincides with the right ear, or the hair line next to right ear | 2 |
| | Right lens | N/A | 3 |
| | Bridge | N/A | 1 (last) |
| | Left lens | The area whose right side coincides with the left side of the nose | 4 |
| | Left temple | The area whose right side coincides with the left side of the face | 5 (first) |

In a step 420, the components breakdown scheme, the hidden area instructions and component assembly order provided for the sector selected in step 404 is stored in the models database, for example. Next, in a step 422, it is determined whether the sector selected in step 404 is the last sector. If it is determined that the sector selected is the last sector, then process 200 of FIGS. 6A and 6B proceeds to step 206 of FIG. 6A. If, however, it is determined that the sector is selected is not the last sector, then in a step 424 another sector is selected and the process proceeds to step 406 mentioned above.

It is important to note that in step 204, as set forth in detail in FIGS. 9A and 9B, the hidden areas are determined without taking into account a specific user's picture, rather the generic article of clothing is imagined in its normal position on an imaginary person. Thus, rotation of the three-dimensional model of the generic article of clothing provides three-dimensional sectors, each one of which induces a division of the generic article of clothing into its various components and each component has associated therewith hidden area instructions and component assembly order. It should be borne in mind that the breakdown scheme of components of the generic article of clothing, hidden area instructions associated with each component and/or the component assembly order vary from one three-dimensional sector to another and this information is stored in the user's picture database.

The present invention recognizes that the three-dimensional model of the selected pair of eye-glasses may be divided into three-dimensional sectors and these sectors may dictate a specific component breakdown scheme, which three-dimensional sectors and breakdown scheme are substantially similar to the three-dimensional sectors and component breakdown scheme of the three-dimensional model of the generic pair of eye-glasses. Consequently, the three-dimensional models of the eye-glasses created in step 202 are divided into the same sectors as the three-dimensional model of the generic eye-glasses. Furthermore, the component breakdown scheme associated (within each sector) of the three-dimensional model of eye-glasses is the same as component breakdown scheme associated with the three-dimensional model of the generic eye-glasses. Thus, the information regarding the division of sectors and the component breakdown scheme of the three-dimensional models of the eye-glasses are saved with each pair of eye-glasses in the models database. The hidden areas instructions and component assembly order, however, need not be stored with each pair of eye-glasses in the models database.

Figure 10A:
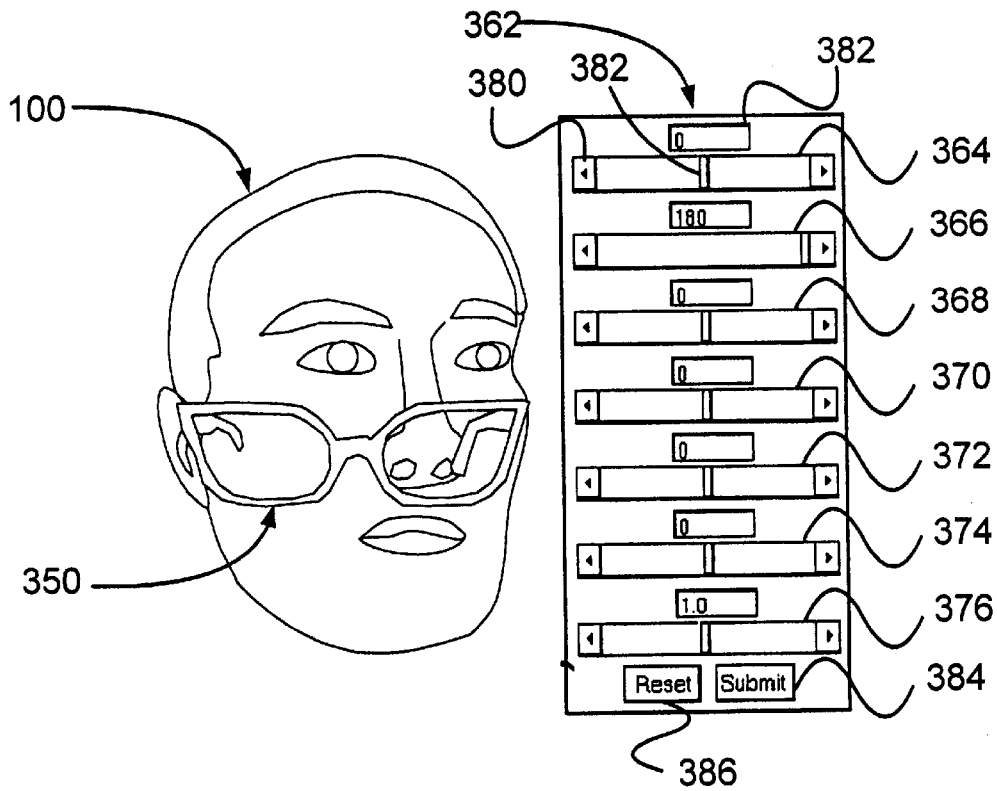
FIGS. 10A and 10B shows the position of the generic pair of eye-glasses of FIG. 8 before and after the step of manipulating the generic eye-glasses on the image of a person, respectively, according to step 212 of FIG. 6A.
Figure 10B:
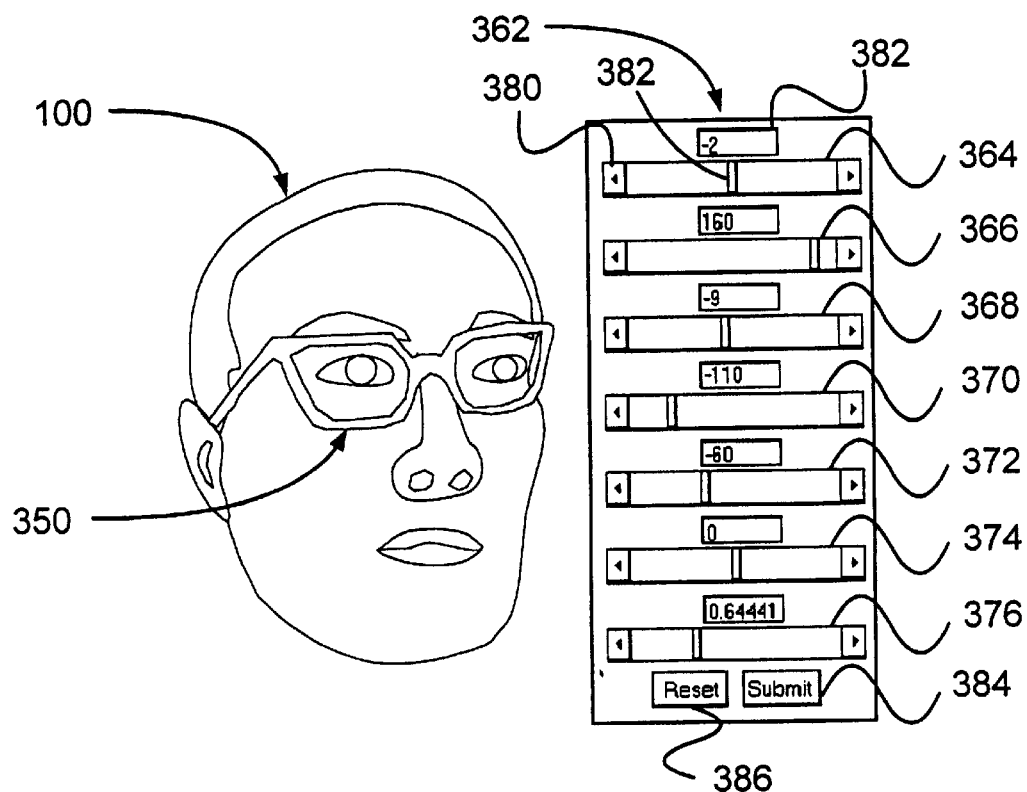

FIGS. 10A and 10B show how generic pair of eye-glasses 350 are manipulated in step 212 of FIG. 6A, according to one embodiment of the present invention, on an image of the person 100 to arrive at user's picture three-dimensional clothing parameters, which are stored in the user's picture database. FIG. 10A shows a display panel 362 that includes a plurality of parameter value adjusters, one for each of the user's picture three-dimensional clothing parameters. By way of example, parameter value adjusters 364,366 and 368 may be dedicated to adjusting the values of alpha, beta and gamma angles, parameter value adjusters 370, 372 and 374 may be dedicated to adjusting the values of X-coordinate, Y-coordinate and Z-coordinate and parameter value adjuster 376 may be dedicated to adjusting the scaling factor. Parameter value adjuster 364, as an exemplar, has a left arrow icon 380 for lowering the parameter value, a right arrow icon for increasing the parameter value, a level indicator 382 for increasing and decreasing the parameter value. Furthermore, a display unit 382 disposed above parameter value adjuster 354 displays the current value of the parameter. At the bottom of display panel are a reset button 386 and a submit button 384.

In one embodiment of the present invention, generic pair of eye-glasses 350 are manually manipulated by an operator on image of a person 100. FIG. 10A shows the position of generic pair of eye-glasses 350 relative to image of a person 100, when generic pair of eye-glasses 350 are retrieved by the operator from models database 300 of FIG. 7 on image of a person 100 that is already displayed on a monitor of stand-alone client 108 of FIG. 4 or of stand-alone computer 124 of FIG. 5. As shown in FIG. 10A, generic pair of eye-glasses 350 are positioned at an arbitrary location, which may be based on a default setting and is not the normal position, i.e. around the person's eyes, of generic pair of eye-glasses 350 on image of the person 100. Before, generic pair of eye-glasses 350 are manipulated, display units in display control panel 362 may display the values of the parameters at the default setting.

Now referring to FIG. 10B, the operator may manually adjust the location and scale of generic pair of eye-glasses 350 so that they are in their normal position around the person's eyes. This may be accomplished by depressing on a left arrow icon 380, a right arrow icon and/or a level indicator 382. Alternatively, the operator may manually adjust the location and scale of generic pair of eye-glasses 350 by clicking on the image of generic pair of eye-glasses 350 and moving them to the appropriate location. Regardless of how the operator manipulates the image of generic pair of eye-glasses, the values displayed on the display units when generic pair of eye-glasses 350 acquire their normal position around the person's eyes may be stored in the user's picture database by pushing submit button 384 in display panel 362.

Figure 11A:
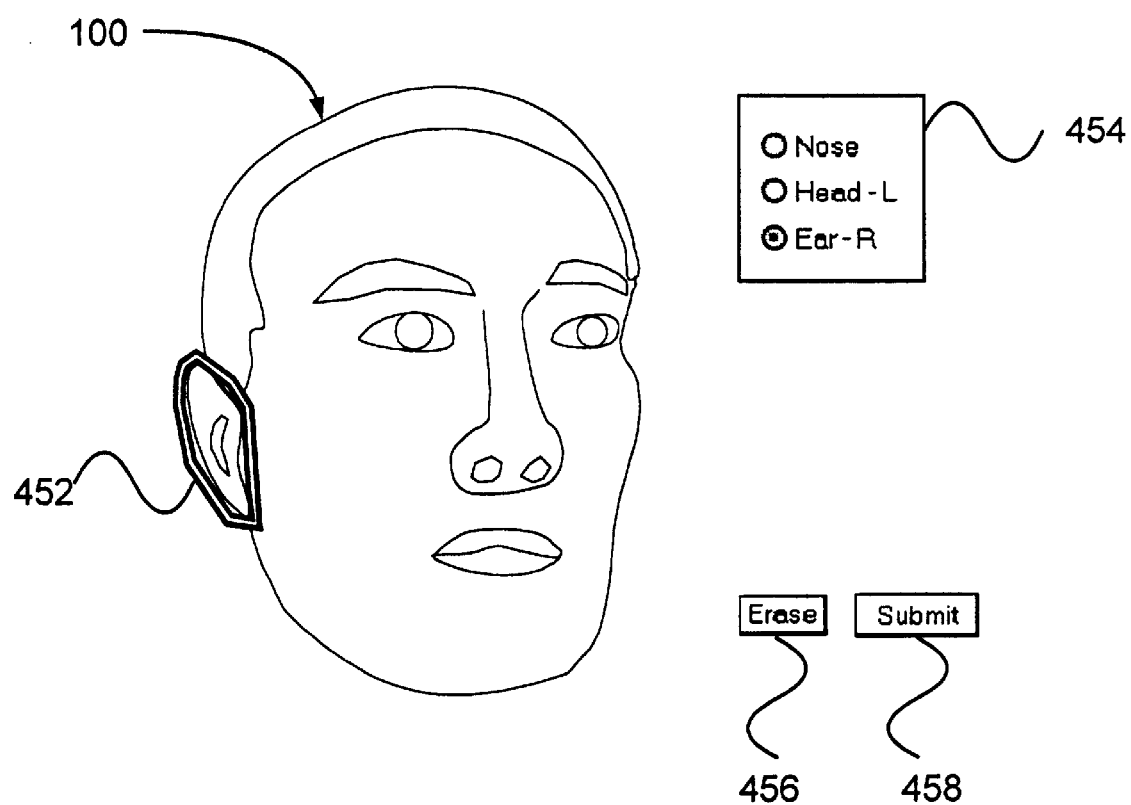
FIGS. 11A–11C shows the marking of hidden areas on the image of a person, according to step 214 of FIG. 6A.
Figure 11B:
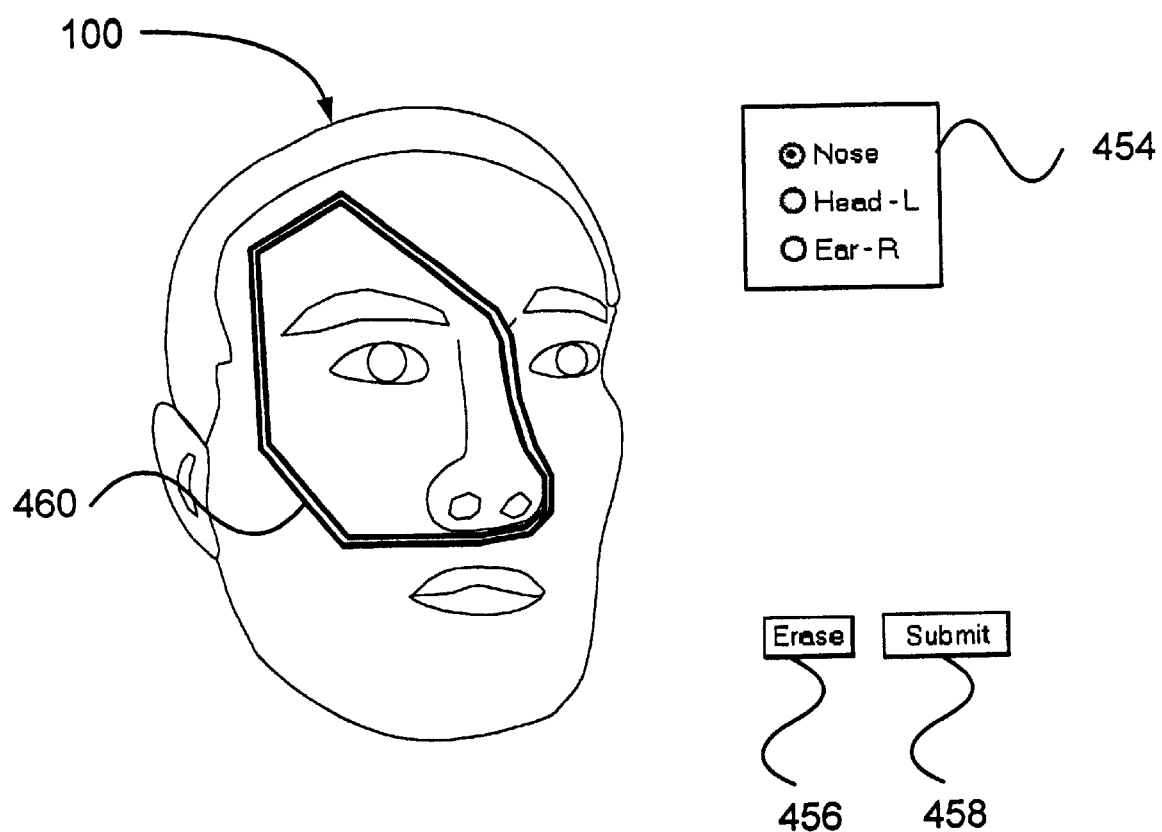
Figure 11C:
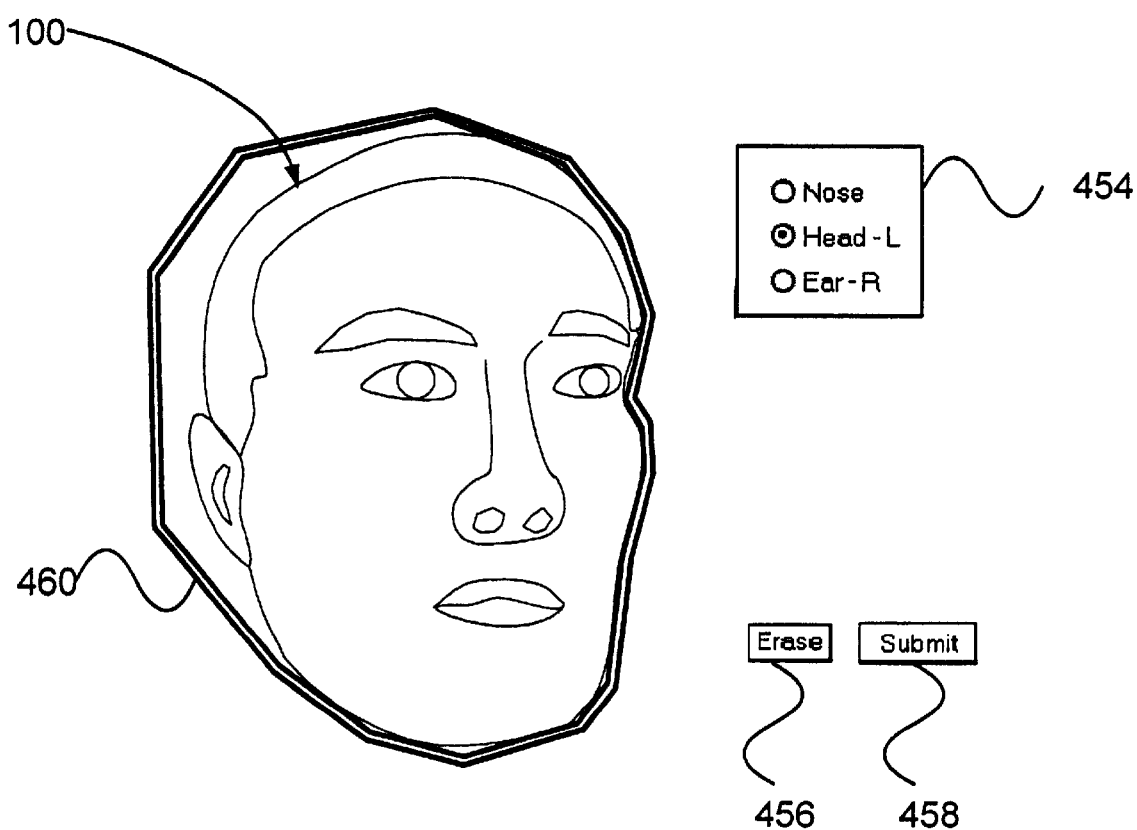

FIGS. 11A, 11B and 11C show how the hidden area instructions stored in step 204 are implemented, in accordance with one embodiment of the present invention, on as specific user's picture by an operator in step 214 of FIG. 6A. FIG. 11A shows a polygonal hidden area or plane 452 drawn on image of the person 100 as instructed by the graphic designer's hidden area instructions in Table 1 for the right temple component of the generic pair of eye-glasses 350. Consequently, hidden area 452 is drawn on an image of a person such that the right side of hidden area 452 coincides with the person's right ear or the person's hairline next to the person's right ear.

FIGS. 11B shows a polygonal hidden area 460 drawn on image of a person 100 as instructed by the graphic designer's hidden area instructions in Table 1 for the left lens component of the generic pair of eye-glasses. As a result, hidden area 460 is drawn on image of a person 100 such that the right side of hidden area 460 coincides with the left side of the person's nose.

FIG. 11C shows a polygonal hidden area 462 drawn on image of the person 100 as instructed by the graphic designer's hidden area instructions in Table 1 for the left temple component of the generic pair of eye-glasses. Consequently, hidden area 462 is drawn on the user's picture such that the right side of hidden area 462 coincides with the left side of the person's face.

In step 214 the marked up images of FIGS. 11A, 11B and 11C are stored in user's picture database. In order to facilitate subsequent easy retrieval of the marked up images shown in FIGS. 11A, 11B and 11C from memory, a legend display 454 may be disposed next to the images to indicate the part, e.g., nose, head or ear, of the person that is being drawn upon. Furthermore, the marking applications for drawing on the user's picture mentioned above provide an erase button 456, which is depressed to edit the drawing of the hidden areas, and a submit button 458, which is depressed to send the marked-up images for storage in the user's picture database. It is important to note that, in step 216, and, as will be explained later with reference to FIG. 15 the operator may draw hidden areas on the user's picture in the absence of any hidden area instructions from the graphic designer.

After the user selects a pair of eye-glasses from the catalogue stored in the models database, the three-dimensional parameters, e.g., alpha, beta and gamma angles, X and Y coordinates and scaling factor, of the selected eye-glasses are substantially the same as the user's picture three-dimensional clothing parameters that are determined and stored in the user's picture database in step 212. As a result, the selected pair of eye-glasses may acquire on the image of a person substantially the same position that was deemed by the operator to be a "normal" position of the generic eye-glasses on the image of a person.

It is important to note that the alpha, beta and gamma angles of the selected three-dimensional model of eye-glasses falls within the angle ranges of one of the three-dimensional sectors identified in step 208 for those particular eye-glasses. Thus, the component breakdown scheme of the selected eye-glasses within the three-dimensional sector is also known and accordingly the selected eye-glasses are dismembered or broken down into components. A rendered image for each of the three-dimensional, dismembered components, e.g., right and left lens, right and left temple, bridge, etc. is then generated and stored in the models database, for example, as mentioned above with regards to step 220.

The inventive process hereinafter employs the rendered two-dimensional images of the components to generate the resulting two-dimensional image of an article of clothing superimposed on the image of person. As a result, the present invention realizes the relatively fast speed of the second approach of the prior art, which approach combines two-dimensional images of an article of clothing and of a person, as described above, to generate the resulting two-dimensional image of an article of clothing superimposed on the image of person.

Figure 12:
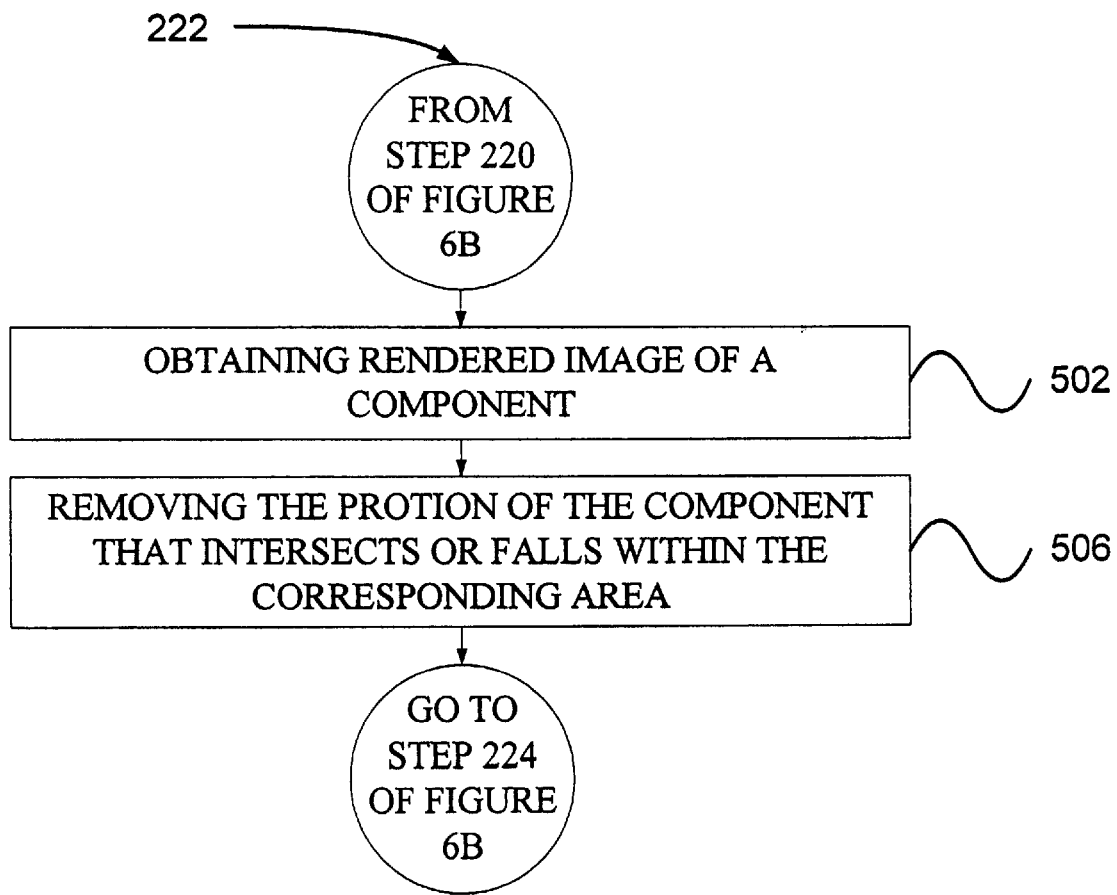
FIG. 12 is a flowchart showing in further detail the steps, according to one embodiment of the present invention, taken to remove hidden areas from the rendered image of the components of the selected article of clothing according to step 222 of FIG. 6B.

FIG. 12 is a flowchart showing in further detail the removal of hidden areas as mentioned in step 222 of FIG. 6B, according to one embodiment of the present invention. The step of removing hidden areas begins at a step 502, which includes obtaining a rendered image of a component that was generated in step 220. By way of example, this step may be carried out by retrieving the rendered image of the component that was temporarily stored in step 220. The component in the rendered image, retrieved in step 502, may be modified based on the marked-up user's picture that was stored in step 214. The rendered images of components that need not undergo modification proceed to step 224 of FIG. 6B for assembly. At a step 506, the rendered image of the component undergoes precise cutting or at least a portion of the component's rendered image is made fully transparent by a hidden area algorithm. In this step, the hidden area algorithm modifies the appropriate rendered image of components based on the coordinates of the polygonal hidden areas, e.g., 452 of FIG. 11A, 460 of FIG. 11B and 462 of FIG. 11C, marked on the user's picture and the known user's picture three-dimensional clothing parameters. The area of the rendered image of the suspect component that intersects or falls within the polygonal hidden areas are removed. The modified rendered image of the component then proceeds to step 224 for assembly.

Figure 16:
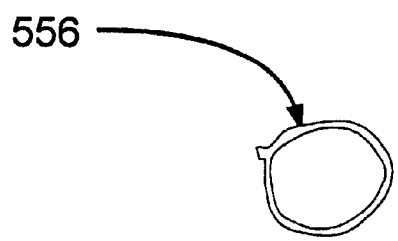
FIG. 16 shows a rendered image of a right lens component of the eye-glasses selected by a user.
Figure 17A:
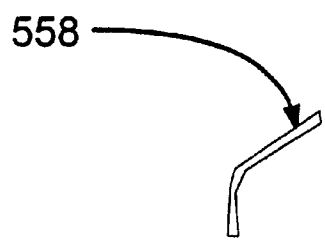
FIG. 17A shows a rendered image of a right temple component of the eye-glasses selected by a user.
Figure 17B:
FIG. 17B shows the rendered image of the right temple component of FIG. 17A that has been modified according to step 214 of FIG. 6A.

The steps of FIG. 12 applied to the dismembered parts of the selected eye-glasses mentioned above produces modified and unmodified rendered images of components that are described hereinafter. FIG. 13A shows an unmodified left temple 552 and FIG. 13B shows a left temple 552' that is modified according to the marked-up user's picture in FIG. 11C, which picture was stored in user's picture database in step 214. FIG. 14A shows an unmodified left lens 554 and FIG. 14B shows a left lens 554' that was modified according to the marked-up user's picture in FIG. 11B. FIGS. 15 and 16 show unmodified rendered images of a bridge 560 and right lens 556, respectively, that proceed to the next step of assembly. FIG. 17A shows an unmodified rendered image of a right temple 558 and FIG. 17B shows a rendered image of right temple 558' that was modified according to the marked-up user's picture in FIG. 11A. As mentioned before, the modified rendered images described above also proceed to assembly described hereinafter in greater detail.

The assembly of the rendered images takes place in step 224 of FIG. 6B. Step 224 may begin when the user picture from the user's picture database is retrieved. As mentioned before, the user's picture serves as a background and upon which the rendered images of eye-glass components are assembled according to the assembly order specified in Table 1.

Figure 2A:
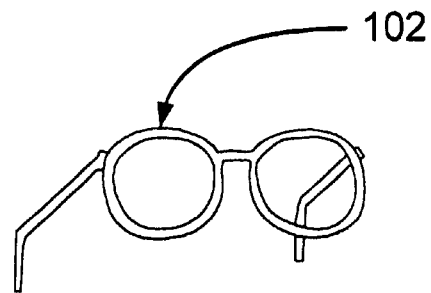
FIG. 2A shows a pair of eye-glasses.
Figure 2B:
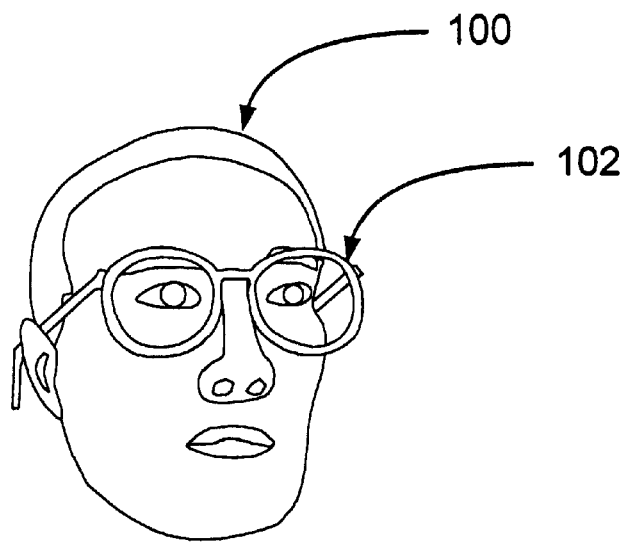
FIG. 2B shows a frontal view of a two dimensional image, in which the person of FIG. 1 is wearing the eye-glasses of FIG. 2A.
Figure 18A:
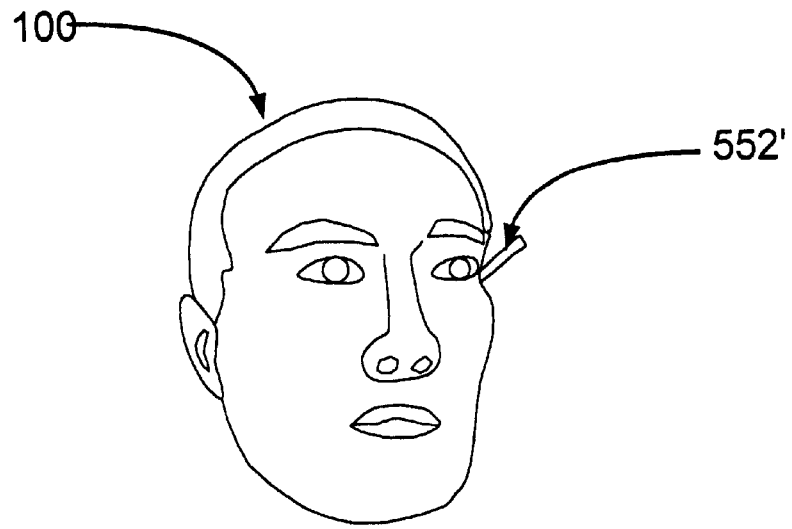
FIGS. 18A–18E shows how the modified rendered images of FIGS. 113B, 14B, 17B and unmodified rendered images of FIGS. 15 and 16 are assembled on the image of a person according to step 224 of FIG. 6B.
Figure 18B:
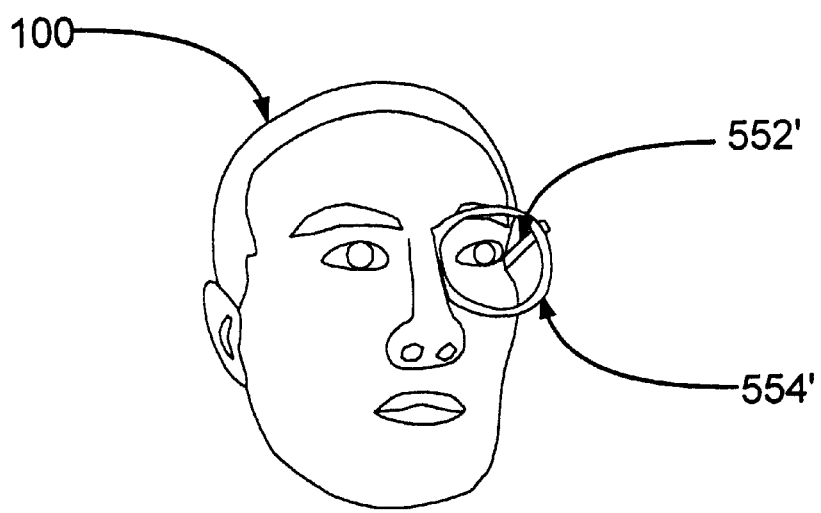
Figure 18C:
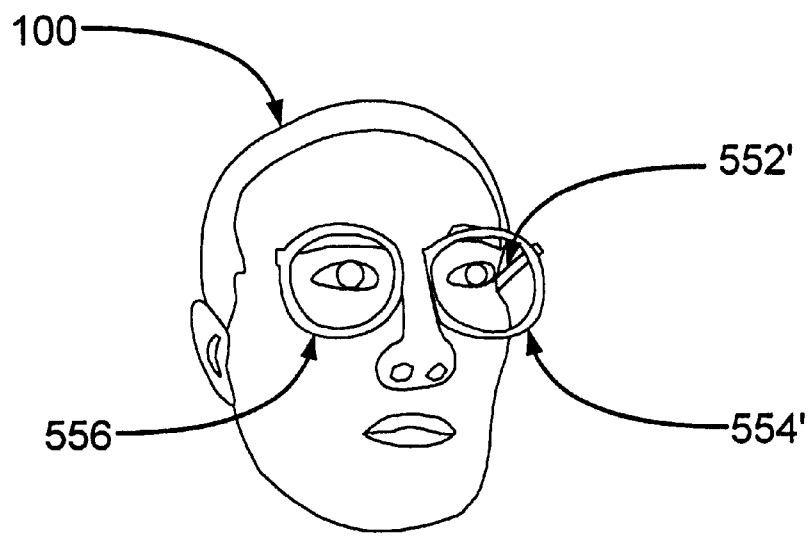
Figure 18D:
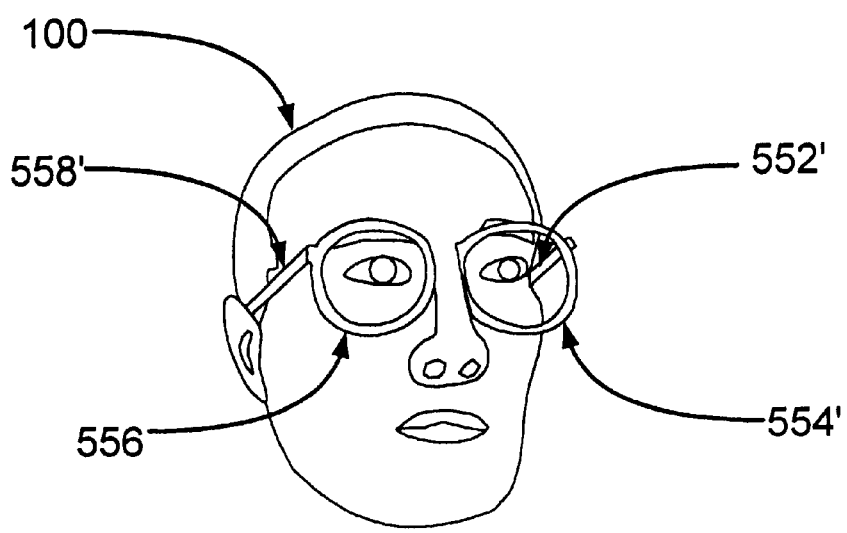
Figure 18E:
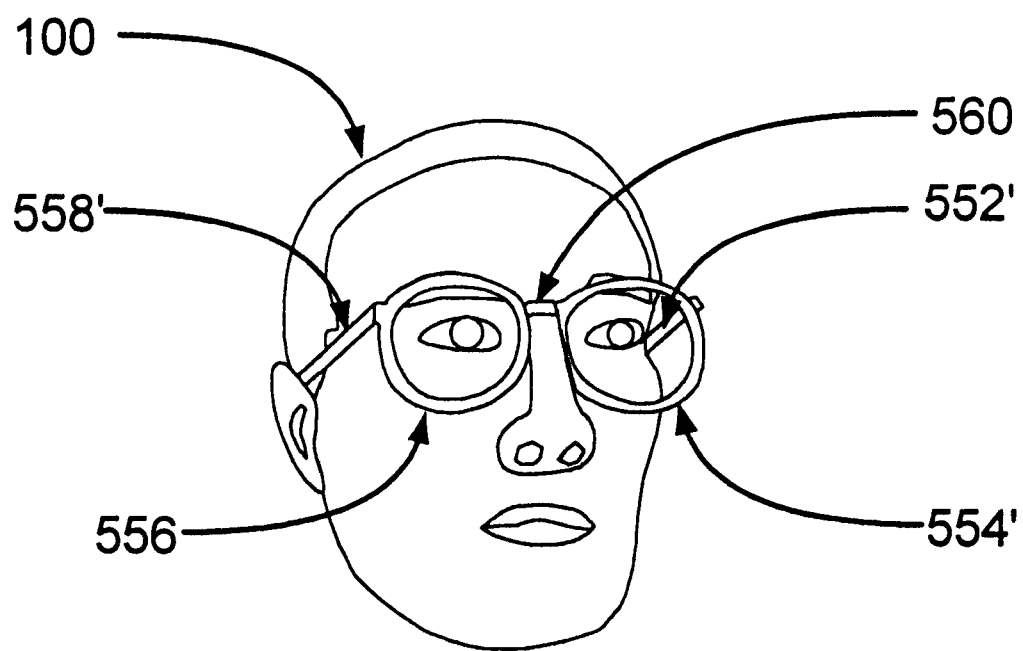

FIG. 18A shows that the rendered image of modified left temple 552' is the first image that is superimposed on image of a person 100. FIG. 18B shows that the rendered image of modified left lens 554' is the second image to be stored. Similarly, FIG. 18C shows that right lens 556 and modified right temple 558' of FIG. 18D are then assembled in order over image of a person 100. Finally, bridge 560 is assembled to produce the two-dimensional image of eye-glasses that are superimposed on the image of a person. It is important to note that the two-dimensional image of FIG. 18E is the same as two-dimensional image of FIG. 2B. The resulting image of a person wearing eye-glasses of a user's choice is presented to a user in step 226.

In the resulting two-dimensional image of a person wearing eye-glasses of FIG. 18E, the hidden areas of the article of clothing were identified by the graphic designer without having the benefit of looking at the user's picture. If the user's picture had an extraneous object, e.g., the person's hand, located where at least a portion of the selected pair of eye-glasses are superimposed, the graphic designer may not be able to provide hidden area instructions to account for the presence of such an extraneous object, without looking at the user's picture. The present invention, therefore, provides an optional step 216, in which additional hidden areas are identified and marked by the operator, who does have the benefit of looking at the user's picture having the extraneous object. Bearing in mind the teachings of the present invention, those skilled in the art will recognize that optional step 216 may be carried out contemporaneously with step 214, when the operator is marking the user's picture according to the graphic designer's hidden area instructions. In other words, during step 214, the operator may identify and draw hidden areas on the user's picture that account for the presence of the above-mentioned extraneous object when the operator is drawings hidden areas according to graphic designer's hidden area instructions.

Figure 19:
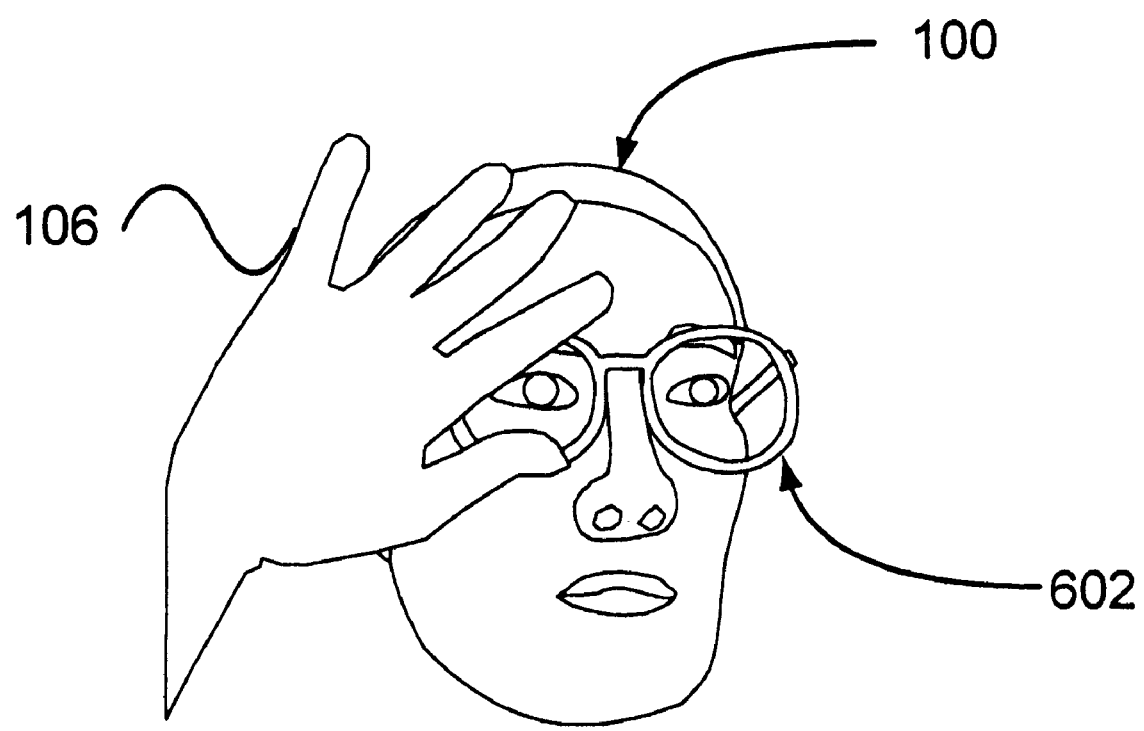
FIG. 19 shows a person wearing a pair of eye-glasses selected by a user and having the person's hand in front of the eye-glasses.

FIG. 19 shows image of a person 100 having superimposed thereon eye-glasses 602, which are partially covered by a person's hand 106. Specifically, the right lens of eye-glasses 106 are covered by person's hand 106. In order to produce the image shown in FIG. 19, the same steps described above to produce the image of FIG. 18E may be carried out except, in an additional step 216, the operator may draw on the user's picture polygonal hidden area(s) that are similar in nature to those shown in FIGS. 11A, 11B and 11C to account for the presence of person's hand 106. By way of example, the polygonal hidden areas drawn by the operator to account for person's hand 106 may include polygonal hidden areas drawn around the person's right eye in the user's picture. The marked-up user's picture, along with polygonal hidden areas of FIGS. 11A, 11B and 11C, is then stored in the user's picture database. Subsequently, during step 222, when a hidden area algorithm is activated, at least a portion of the rendered image of the right lens of eye-glasses 602 is cut or made transparent. Then the rendered images of the various components, which includes the modified, rendered image of the right lens, are assembled on image of the person 100 to depict eye-glasses 602 in their natural position, i.e. underneath the person's hand. As mentioned above, the prior art is unable to account for the presence of the person's hand, for example, and show the eye-glasses erroneously covering the person's hand.

Figure 20A:
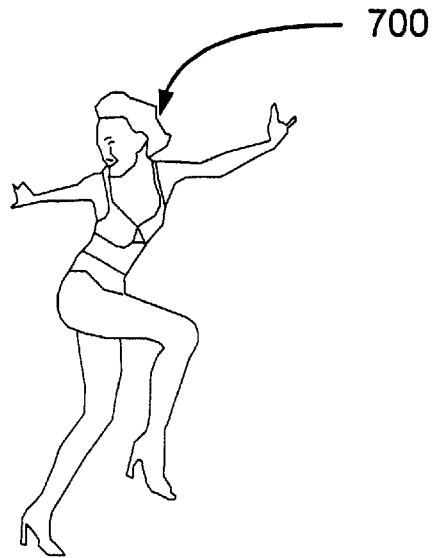
FIGS. 20A–20D shows warping, according to one embodiment of the present invention, a generic article of clothing when it is positioned on an image of a person.
Figure 20B:
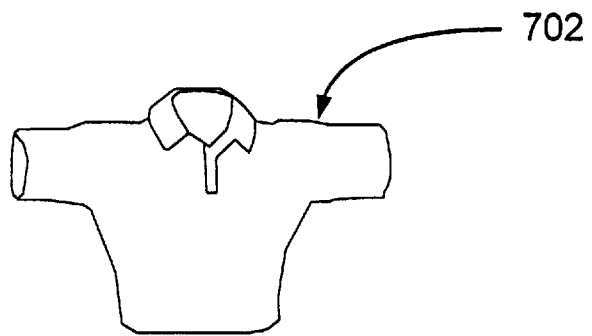

The present invention, in its two dimensional image of a person wearing an article of clothing, accounts for different properties associated with articles of clothing, e.g., the draping effect of soft fabrics on the image of a person produced by creases, wrinkles and/or bends in the soft fabric, etc. FIG. 20A shows an image of a person 700 striking a pose. FIG. 20B shows an image of a generic t-shirt 702 that is made from a soft fabric material.

Figure 20C:
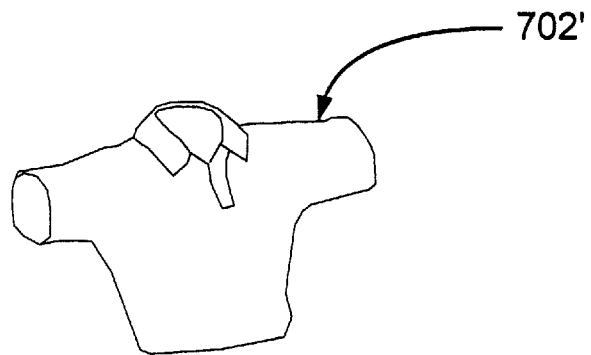

In order to produce, according to one embodiment of the present invention, a two dimensional image of a person 700 having superimposed thereon an image of a t-shirt, substantially the same steps described above with regards to eye-glasses may be carried out except, in step 212 the operator "warps" the generic article of clothing. The term "warps," as used in connection with the description of this invention, refers to modifications made to an image of an article of clothing, e.g., by drawing creases, wrinkles and/or bends in the article of clothing, to mimic the draping affect of a soft fabric material, for example, on the image of a person. By way of example, in step 212 of FIG. 6A, generic t-shirt 702 is manipulated, as shown in FIG. 20C in its manipulated state 702', relative to image of a person 700 of FIG. 20A to arrive at the user's picture three-dimensional clothing parameters. The operator then warps the generic t-shirt as shown in FIG. 20D using the marking application mentioned above.

Figure 20D:
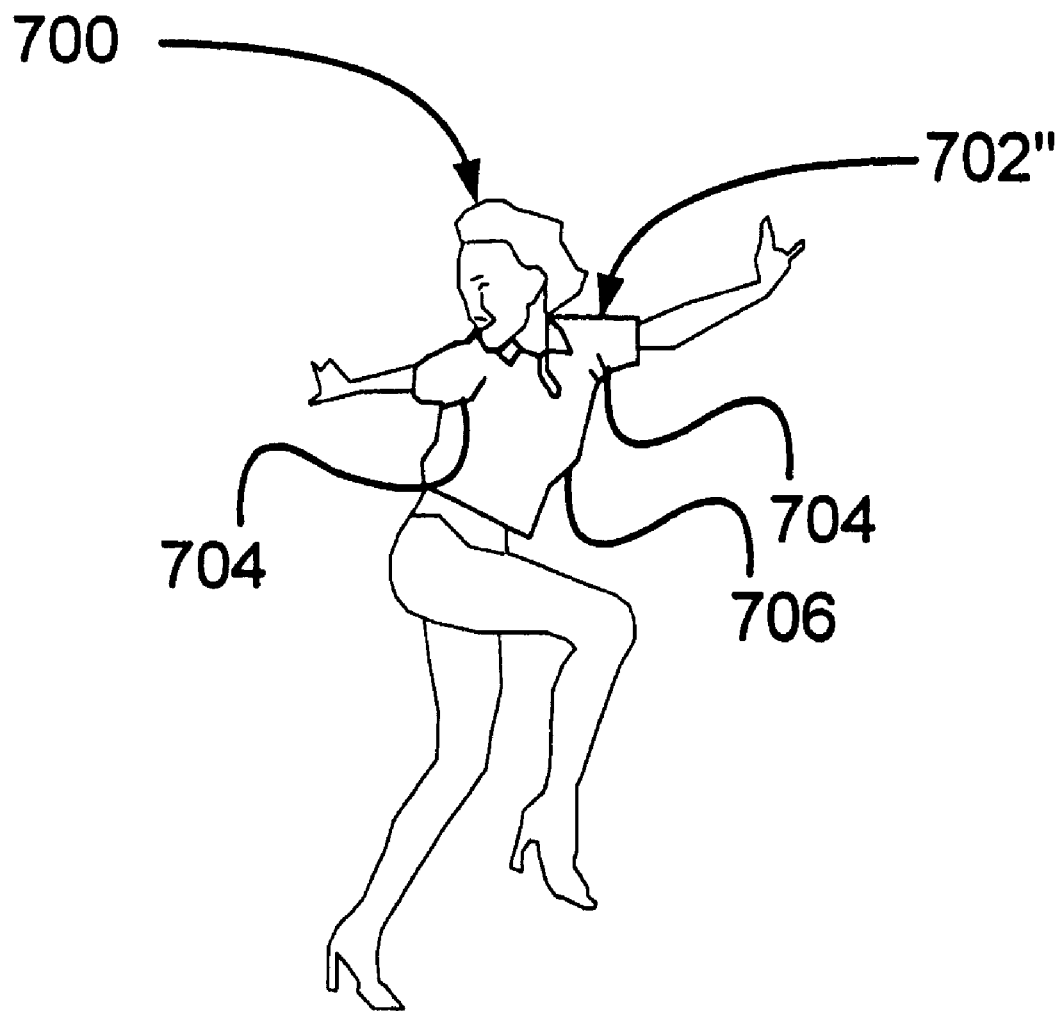

FIG. 20D shows the warped, manipulated generic t-shirt 702" that is positioned on image of a person 700 and includes wrinkles 704 and bends 706. Bearing in mind the teachings of the present invention, those skilled in the art will recognize that after the t-shirt selected by a user is assembled on image of a person 700, a more realistic depiction of a person wearing a t-shirt is realized. It is important to note that the prior art fails to capture the natural look, which is realized by the present invention at least in part due to warping of an article of clothing as it is superimposed on an image of a person.

Those skilled in the art will recognize that not all the steps described in FIGS. 6A and 6B are necessary to produce the two-dimensional image of the present invention. By way of example, if the selected article of clothing and the generic article of clothing are the same then steps 208 and 220 of FIGS. 6A and 6B, respectively, are not necessary. As another example, the person may strike a pose where it is not necessary to activate the hidden area algorithm and, therefore all steps that facilitate in cutting at least a portion of a rendered image are not required. As yet another example, it is not necessary to store in the models database the information regarding three-dimensional sectors and component breakdown for each article of clothing because such information is the same for all articles of clothing and may be retrieved from the data for the generic article of clothing and is applied to an article of clothing after it is selected.

Some steps of process 200 of FIGS. 6A and 6B, in accordance with one embodiment of the present invention, are carried out by a graphic designer (e.g., steps 202, 204 and 206), a user, an operator (e.g., steps 212 and 214) and an automated system (e.g., steps of automated process 230). In this embodiment, the steps of automated process 230 may be implemented in stand-alone computer 124 of FIG. 5 or a network having at least Web server 112 and stand-alone client 108 of FIG. 4. In the network configuration of FIG. 4, some or all the steps of automated process 230 may be carried out in Web server 112 and stand-alone client 108. Bearing in mind the teachings of the present invention, those skilled in the art will recognize that the automated process 230 implements the inventive process, according to one embodiment, by obtaining information such as the user's picture three-dimensional clothing parameters, user's picture, component breakdown scheme, marked-up user's picture or hidden area information, etc. Furthermore, those skilled in the art will recognize that automated process 230 may not need all the information mentioned above. By way of example, in one embodiment, automated process 230 may require user's picture three-dimensional clothing parameters and the user's picture.

Alternatively, in other embodiments of the present invention, one person can serve as one or more of these roles. By way of example, the operator and user may be the same person, working off a web browser station and performing the functions of the user and operator described above. As another example, substantially all the steps of the present invention are performed by the automated system. In one embodiment of this example, a picture taken from a digital camera is sent directly to Web server 112 of FIG. 4, where it is automatically combined with the selected article of clothing to produce the two-dimensional image of the present invention. In this embodiment, some or all the steps of automated process 230 may be carried out in Web server 112 and stand-alone client 108 in the network configuration of FIG. 4.

The present invention provides a significant improvement over the prior art approaches of generating a two-dimensional image of an article of clothing superimposed on an image of a person. By way of example, the present invention's ability to deal with the presence of an extraneous object on the image of a person and feature of warping the article of clothing offers the advantage of realistically depicting the article of clothing superimposed on the image of a person. As another example, the present invention dismembers the three-dimensional model of article of clothing into its three-dimensional models of components, which are converted to two-dimensional rendered images. The two-dimensional rendered images quickly combine with the two-dimensional user's picture to produce the two-dimensional image of FIG. 2B. Furthermore, the memory space required for storing two-dimensional images is less than the memory space required for storing three-dimensional models. Thus, the advantages of the present invention facilitate in quickly producing a realistic effect of a person wearing an article of clothing in a two-dimensional image that is not accomplished by the prior art systems and methods.

While this invention has been described in terms of several preferred embodiments, there are alterations, permutations and equivalents which fall within the scope of this invention. It should also be noted that there are many alternative ways of implementing the methods and apparatuses of the present invention. By way of example, the present invention has been described in terms of articles of clothing, e.g., eye-glasses, t-shirts, pants, shirts and the like, jewelry items like rings, watches, necklaces, earrings etc., shoes, socks, etc., however, those skilled in the art will recognize that these examples are not intended to limit the scope of the present invention and that there is no reason why in principle the teachings of the present invention may not apply in generating an image of a first object superimposed on a second object, when in fact the first object is not superimposed on the second object. It is, therefore, intended that the following appended claims be interpreted as including all such alterations, permutations and equivalents that fall within the true spirit and scope of the present invention.

What is claimed is:

1. A computer-implemented process of generating a two dimensional image of a selected article of clothing superimposed at a location on a two-dimensional image of a person using a computer network having at least a server and a client computer, comprising:

retrieving said two-dimensional image of said person from a database;

obtaining user's picture three-dimensional clothing parameters associated with said person, said user's picture three-dimensional clothing parameters specifies at least said location of a generic article of clothing on said image of said person;

manipulating using at least one of said server and said client computer said three-dimensional model of said selected article of clothing according to said user's picture three-dimensional clothing parameters such that said selected article of clothing is positioned at said location on said image of said person;

converting said three-dimensional model of said selected article of clothing into a two-dimensional image; and assembling said two-dimensional image of said selected article of clothing on said image of said person and thereby generating a two-dimensional image of said article of clothing on said image of said person.

2. The computer-implemented process of claim 1, wherein said retrieving the image of the person includes retrieving the image of the person from a magnetic storage disk or from a memory storage area of a World Wide Web server.

3. The computer-implemented process of claim 1, wherein said obtaining said user's picture three-dimensional clothing parameters includes manipulating using at least one of said server and said client computer the three-dimensional model of generic article of clothing such that the generic article of clothing is positioned at the location on the image of the person and said user's picture three-dimensional clothing parameters define the position of the generic article of clothing at the location on the image of the person.

4. The computer-implemented process of claim 3, wherein the user's picture three-dimensional clothing parameters include at least one of X and Y-coordinates, alpha, beta and gamma angles and a scaling factor, wherein said alpha angle is an angle with respect to the X-axis, said beta angle is an angle with respect to the Y-axis and said gamma angle with respect to the Z-axis.

5. The computer-implemented process of claim 1, further comprising:

obtaining a component breakdown scheme, said component breakdown scheme specifies a manner in which said generic article of clothing is dismembered into components of said generic article of clothing;

dismembering using a processor said three-dimensional model of said selected article of clothing into three-dimensional models of components of said selected article of clothing as specified by said component breakdown scheme;

obtaining component assembly order information, wherein said component assembly order information specifies an order in which the components of the selected article of clothing are assembled on said image of said person; and wherein:

said converting includes rendering said three-dimensional models of said components of said selected article of clothing into two-dimensional images of said components of said selected article of clothing, such that the two-dimensional images of the components of the selected article of clothing reflects the texture, color, opacity and bump maps of the three-dimensional models of the components of the selected article of clothing; and said assembling includes assembling said two-dimensional images of the components of the selected article of clothing as specified by said component assembly order information on the image of the person.

6. The computer-implemented process of claim 5, wherein said obtaining component breakdown scheme includes dividing the three-dimensional angle space of the three-dimensional model of the generic article of clothing into three-dimensional sectors and for each one of said three-dimensional sectors specifying the component breakdown scheme.

7. The computer-implemented process of claim 5, wherein said obtaining the component assembly order information is determined by a graphic designer who specifies the component assembly order information for each three-dimensional sector of the generic article of clothing, said three-dimensional sector results from dividing the three-dimensional angle space of the generic article of clothing.

8. The computer-implemented process of claim 1, wherein said manipulating the three-dimensional model of said selected article of clothing includes scaling the three-dimensional model of selected article of clothing such that the size of the three-dimensional model of the selected article of clothing is increased or decreased by substantially same amount as the size of the three-dimensional model of the generic article of clothing is increased or decreased and the user's picture three-dimensional clothing parameters specify the amount by which the size of the three-dimensional model of the generic article of clothing is increased or decreased.

9. The computer-implemented process of claim 1, wherein said converting the three-dimensional model of the selected article of clothing includes rendering the three-dimensional model of the selected article of clothing to form the two-dimensional image of the selected article of clothing such that the two-dimensional image of the article of clothing reflects the texture, color, opacity and bump maps of the three-dimensional model of the selected article of clothing.

10. The computer-implemented process of claim 1, wherein said article of clothing includes eye-glasses, t-shirts, pants, shirts, tops, watches, rings, necklaces, jewelry items, earrings, shoes, socks, ties and the like.

11. The computer-implemented process of claim 10, wherein said article of clothing includes eye-glasses and t-shirts.

12. The computer-implemented process of claim 1, wherein said user's picture three-dimensional clothing parameters further includes data for warping of the generic article of clothing, said warping simulates draping effect of a soft article of clothing material on a body of the person when the person wears the soft article of clothing material.

13. The computer-implemented process of claim 12, wherein the information about warping includes locations where at least one of wrinkles, creases and bends in the soft article of clothing are drawn by an operator when said operator positions the generic article of clothing at the location on the image of the person.

14. The computer-implemented process of claim 12, wherein said manipulating the three-dimensional model of the selected article of clothing further includes warping the three-dimensional model of the selected article of clothing such that the three-dimensional model of the selected article of clothing includes wrinkles, creases and bends in the soft article of clothing to effectively simulate the draping effect of the soft article of clothing when the person wears the soft article of clothing material.

15. The computer implemented process of claim 1, further comprising using at least one of the server and the client computer and presenting to a user the two-dimensional image of the article of clothing superimposed on the image of the person.

16. The computer implemented process of claim 1, wherein the computer network is Internet.

17. The computer implemented process of claim 1, wherein the computer network is Intranet or enterprise network.

18. A computer-implemented process of generating a two dimensional image of a selected article of clothing superimposed at a location on a two-dimensional image of a person using a computer, comprising:
  retrieving said two-dimensional image of said person from a database;
  obtaining user's picture three-dimensional clothing parameters associated with said person, said user's picture three-dimensional clothing parameters specifies at least said location of a generic article of clothing on said image of said person;
  manipulating using said computer said three-dimensional model of said selected article of clothing according to said user's picture three-dimensional clothing parameters such that said selected article of clothing is positioned at said location on said image of said person;
  converting said three-dimensional model of said selected article of clothing into a two-dimensional image; and
  assembling said two-dimensional image of said selected article of clothing on said image of said person and thereby generating a two-dimensional image of said article of clothing on said image of said person.

19. The computer-implemented process of claim 18, wherein said retrieving the image of the person includes retrieving the image of the person from a magnetic storage disk or from a memory storage area of a World Wide Web server.

20. The computer-implemented process of claim 18, wherein said obtaining said user's picture three-dimensional clothing parameters includes manipulating using the computer the three-dimensional model of generic article of clothing such that the generic article of clothing is positioned at the location on the image of the person and said user's picture three-dimensional clothing parameters define the position of the generic article of clothing at the location on the image of the person.

21. The computer-implemented process of claim 20, wherein the user's picture three-dimensional clothing parameters include at least one of X and Y-coordinates, alpha, beta and gamma angles and a scaling factor, wherein said alpha angle is an angle with respect to the X-axis, said beta angle is an angle with respect to the Y-axis and said gamma angle with respect to the Z-axis.

22. The computer-implemented process of claim 18, further comprising:
  obtaining a component breakdown scheme, said component breakdown scheme specifies a manner in which said generic article of clothing is dismembered into components of said generic article of clothing;
  dismembering using a processor said three-dimensional model of said selected article of clothing into three-dimensional models of components of said selected article of clothing as specified by said component breakdown scheme;
  obtaining component assembly order information, wherein said component assembly order information specifies an order in which the components of the selected article of clothing are assembled on said image of said person; and
  wherein:
    said converting includes rendering said three-dimensional models of said components of said selected article of clothing into two-dimensional images of said components of said selected article of clothing, such that the two-dimensional images of the components of the selected article of clothing reflects the texture, color, opacity and bump maps of the three-dimensional models of the components of the selected article of clothing; and
    said assembling includes assembling said two-dimensional images of the components of the selected article of clothing as specified by said component assembly order information on the image of the person.

23. The computer-implemented process of claim 22, wherein said obtaining component breakdown scheme includes dividing the three-dimensional angle space of the three-dimensional model of the generic article of clothing into three-dimensional sectors and for each one of said three-dimensional sectors specifying the component breakdown scheme.

24. The computer-implemented process of claim 22, wherein said obtaining the component assembly order information is determined by a graphic designer who specifies the component assembly order information for each three-dimensional sector of the generic article of clothing, said three-dimensional sector results from dividing the three-dimensional angle space of the generic article of clothing.

25. The computer-implemented process of claim 18, wherein said manipulating the three-dimensional model of said selected article of clothing includes scaling the three-dimensional model of selected article of clothing such that the size of the three-dimensional model of the selected article of clothing is increased or decreased by substantially same amount as the size of the three-dimensional model of the generic article of clothing is increased or decreased and the user's picture three-dimensional clothing parameters specify the amount by which the size of the three-dimensional model of the generic article of clothing is increased or decreased.

26. The computer-implemented process of claim 18, wherein said converting the three-dimensional model of the selected article of clothing includes rendering the three-dimensional model of the selected article of clothing to form the two-dimensional image of the selected article of clothing such that the two-dimensional image of the article of clothing reflects the texture, color, opacity and bump maps of the three-dimensional model of the selected article of clothing.

27. The computer-implemented process of claim 18, wherein said article of clothing includes eye-glasses, t-shirts, pants, shirts, tops, watches, rings, necklaces, jewelry items, earrings, shoes, socks, ties and the like.

28. The computer-implemented process of claim 27, wherein said article of clothing includes eye-glasses and t-shirts.

29. The computer-implemented process of claim 18, wherein said user's picture three-dimensional clothing parameters further includes data for warping of the generic article of clothing, said warping simulates draping effect of a soft article of clothing material on a body of the person when the person wears the soft article of clothing material.

30. The computer-implemented process of claim 29, wherein the information about warping includes locations where at least one of wrinkles, creases and bends in the soft article of clothing are drawn by an operator when said operator positions the generic article of clothing at the location on the image of the person.

31. The computer-implemented process of claim 29, wherein said manipulating the three-dimensional model of the selected article of clothing further includes warping using the computer the three-dimensional model of the selected article of clothing such that the three-dimensional model of the selected article of clothing includes wrinkles, creases and bends in the soft article of clothing to effectively simulate the draping effect of the soft article of clothing when the person wears the soft article of clothing material.

32. The computer implemented process of claim 18, further comprising using the computer and presenting to a user the two-dimensional image of the article of clothing superimposed on the image of the person.

33. The computer implemented process of claim 22, wherein the computer is a personal computer.

34. A computer readable medium comprising instructions for generating a two dimensional image of a selected article of clothing superimposed at a location on a two-dimensional image of a person using a computer, comprising:

instructions configured for retrieving said two-dimensional image of said person from a database;

instructions configured for obtaining user's picture three-dimensional clothing parameters associated with said person, said user's picture three-dimensional clothing parameters specifies at least said location of a generic article of clothing on said image of said person;

instructions configured for manipulating using said computer said three-dimensional model of said selected article of clothing according to said user's picture three-dimensional clothing parameters such that said selected article of clothing is positioned at said location on said image of said person;

instructions configured for converting said three-dimensional model of said selected article of clothing into a two-dimensional image; and instructions configured for assembling said two-dimensional image of said selected article of clothing on said image of said person and thereby generating a two-dimensional image of said article of clothing on said image of said person.

35. The computer readable medium of claim 34, wherein said instructions configured for retrieving the image of the person includes instructions configured for retrieving the image of the person from a magnetic storage disk or from a memory storage area of a World Wide Web server.

36. The computer readable medium of claim 34, wherein said instructions configured for obtaining said user's picture three-dimensional clothing parameters includes instructions configured for manipulating using the computer the three-dimensional model of generic article of clothing such that the generic article of clothing is positioned at the location on the image of the person and said user's picture three-dimensional clothing parameters define the position of the generic article of clothing at the location on the image of the person.

37. The computer readable medium of claim 36, wherein the user's picture three-dimensional clothing parameters include at least one of X and Y-coordinates, alpha, beta and gamma angles and a scaling factor, wherein said alpha angle is an angle with respect to the X-axis, said beta angle is an angle with respect to the Y-axis and said gamma angle with respect to the Z-axis.

38. The computer readable medium of claim 34, further comprising:

instructions configured for obtaining a component breakdown scheme, said component breakdown scheme specifies a manner in which said generic article of clothing is dismembered into components of said generic article of clothing;

instructions configured for dismembering using a processor said three-dimensional model of said selected article of clothing into three-dimensional models of components of said selected article of clothing as specified by said component breakdown scheme;

instructions configured for obtaining component assembly order information, wherein said component assembly order information specifies an order in which the components of the selected article of clothing are assembled on said image of said person; and wherein:

said instructions configured for said converting includes instructions configured for rendering said three-dimensional models of said components of said selected article of clothing into two-dimensional images of said components of said selected article of clothing, such that the two-dimensional images of the components of the selected article of clothing reflects the texture, color, opacity and bump maps of the three-dimensional models of the components of the selected article of clothing; and said instructions configured for said assembling includes assembling said two-dimensional images of the components of the selected article of clothing as specified by said component assembly order information on the image of the person.

39. The computer readable medium of claim 38, wherein said instructions configured for obtaining component breakdown scheme includes instructions configured for dividing the three-dimensional angle space of the three-dimensional model of the generic article of clothing into three-dimensional sectors and instructions for specifying the component breakdown scheme for each one of said three-dimensional sectors.

40. The computer readable medium of claim 34, wherein said instructions configured for manipulating the three-dimensional model of said selected article of clothing includes instructions configured for scaling the three-dimensional model of selected article of clothing such that the size of the three-dimensional model of the selected article of clothing is increased or decreased by substantially same amount as the size of the three-dimensional model of the generic article of clothing is increased or decreased and the user's picture three-dimensional clothing parameters specify the amount by which the size of the three-dimensional model of the generic article of clothing is increased or decreased.

41. The computer readable medium of claim 34, wherein said instructions configured for converting the three-dimensional model of the selected article of clothing includes instructions configured for rendering the three-dimensional model of the selected article of clothing to form the two-dimensional image of the selected article of clothing such that the two-dimensional image of the article of clothing reflects the texture, color, opacity and bump maps of the three-dimensional model of the selected article of clothing.

42. The computer readable medium of claim 34, wherein said computer readable medium includes a tape, a floppy disk, a CD ROM, a carrier wave.

43. The computer readable medium of claim 42, wherein computer readable medium includes a carrier wave.

44. The computer readable medium of claim 34, wherein said user's picture three-dimensional clothing parameters further includes data for warping of the generic article of clothing, said warping simulates draping effect of a soft article of clothing material on a body of the person when the person wears the soft article of clothing material.

45. The computer readable medium of claim 44, wherein the information about warping includes locations where at least one of wrinkles, creases and bends in the soft article of clothing are drawn by an operator when said operator positions the generic article of clothing at the location on the image of the person.

46. The computer readable medium of claim 44, wherein said instructions configured for manipulating the three-dimensional model of the selected article of clothing further includes instructions configured for warping the three-dimensional model of the selected article of clothing such that the three-dimensional model of the selected article of clothing includes wrinkles, creases and bends in the soft article of clothing to effectively simulate the draping effect of the soft article of clothing when the person wears the soft article of clothing material.

47. The computer readable medium of claim 34, further comprising instructions configured for presenting to a user using the computer the two-dimensional image of the article of clothing superimposed on the image of the person.

48. A computer-implemented process for permitting a user to generate a two-dimensional image of a selected article of clothing superimposed at a location on a two-dimensional image of a person, comprising:
   placing a first set of instructions onto a server of a computer network, said first set of instructions including instructions for:
      retrieving said two-dimensional image of said person from a database;
      obtaining user's picture three-dimensional clothing parameters associated with said person, said user's picture three-dimensional clothing parameters specifies at least said location of a generic article of clothing on said image of said person;
      manipulating using at least one of said server and said client computer said three-dimensional model of said selected article of clothing according to said user's picture three-dimensional clothing parameters such that said selected article of clothing is positioned at said location on said image of said person;
      converting said three-dimensional model of said selected article of clothing into a two-dimensional image; and
      assembling said two-dimensional image of said selected article of clothing on said image of said person and thereby generating a two-dimensional image of said article of clothing on said image of said person; and
   providing a second set of instructions to said server to said server, said second set of instructions to said server being configured to permit said first set of instructions to be transmitted to said user of said computer network, wherein said transmitted first set of instructions are configured to be executed at a computer terminal to generate by said user said two-dimensional image of said article of clothing on said image of said person.

49. The computer-implemented process of claim 48, wherein placing said first set of instructions further includes placing instructions for said obtaining said user's picture three-dimensional clothing parameters includes manipulating using at least one of said server and said client computer the three-dimensional model of generic article of clothing such that the generic article of clothing is positioned at the location on the image of the person and said user's picture three-dimensional clothing parameters define the position of the generic article of clothing at the location on the image of the person.

50. The computer-implemented process of claim 49, wherein the user's picture three-dimensional clothing parameters include at least one of X, Y and Z-coordinates, alpha, beta and gamma angles and a scaling factor, wherein said alpha angle is an angle with respect to the X-axis, said beta angle is an angle with respect to the Y-axis and said gamma angle with respect to the Z-axis.

51. The computer-implemented process of claim 48, wherein said placing said first set of instructions further includes placing instructions for:
   obtaining a component breakdown scheme, said component breakdown scheme specifies a manner in which said generic article of clothing is dismembered into components of said generic article of clothing;
   dismembering using a processor said three-dimensional model of said selected article of clothing into three-dimensional models of components of said selected article of clothing as specified by said component breakdown scheme;
   obtaining component assembly order information, wherein said component assembly order information specifies an order in which the components of the selected article of clothing are assembled on said image of said person; and
   wherein:
      said instructions for converting include instructions for rendering said three-dimensional models of said components of said selected article of clothing into two-dimensional images of said components of said selected article of clothing, such that the two-dimensional images of the components of the selected article of clothing reflects the texture, color, opacity and bump maps of the three-dimensional models of the components of the selected article of clothing; and
      said instructions for assembling includes instructions for assembling said two-dimensional images of the components of the selected article of clothing as specified by said component assembly order information on the image of the person.

52. A computer-implemented process of generating a two dimensional image of a selected article of clothing superimposed at a location on a two-dimensional image of a person using a computer network including at least a server and a client computer, comprising:

retrieving a two-dimensional image of said person from a database;

obtaining user's picture three-dimensional clothing parameters associated with said person, said user's picture three-dimensional clothing parameters specifies at least said location of a generic article of clothing on said image of said person;

obtaining a component breakdown scheme, said component breakdown scheme specifies a manner in which said generic article of clothing is dismembered into components of said generic article of clothing;

obtaining hidden area information, said hidden area information specifies the area of said three-dimensional model of said generic article of clothing that is hidden from view when said three-dimensional model of said generic article of clothing is superimposed at said location on said image of said person;

manipulating using at least one said server and said client computer said three dimensional model of said selected article of clothing according to said user's picture three-dimensional clothing parameters such that said selected article of clothing is positioned at said location on said image of said person;

dismembering said three-dimensional model of said selected article of clothing into three-dimensional models of components of said selected article of clothing as specified by said breakdown scheme;

converting said three-dimensional models of said components of said selected article of clothing into a two-dimensional images of said components of said selected article of clothing;

modifying at least one of said two-dimensional images of said components of said selected article of clothing as specified by said hidden area information such that the hidden area identified in said hidden area information for said generic article of clothing are correlated to said two-dimensional images of said selected article of clothing and removed; and assembling said two-dimensional images of said components of said selected article of clothing on said image of said person and thereby generating a two-dimensional image of said article of clothing on said image of said person.

53. A computer-implemented process of generating a two dimensional image of a selected article of clothing superimposed at a location on a two dimensional image of a person using a computer network including at least one of a server and a computer, comprising:

creating a three-dimensional model of said selected article of clothing;

creating a three-dimensional model of a generic article of clothing;

dividing a three-dimensional angle space of said three-dimensional model of said generic article of clothing into three-dimensional sectors;

determining a component breakdown scheme for each three-dimensional sector of said three-dimensional model of said generic article of clothing, said component breakdown scheme specifies a manner in which said three-dimensional model of said generic article of clothing is dismembered into components of said generic article of clothing;

obtaining a two-dimensional image of said person from a database;

manipulating said three-dimensional model of said generic article of clothing such that said article of clothing is positioned at said location on said image of said person;

storing said location in a memory storage area;

manipulating said three dimensional model of said selected article of clothing such that said selected article of clothing is positioned at said location on said image of said person;

dismembering said three-dimensional model of said selected article of clothing into three-dimensional models of components of said selected article of clothing as specified by said breakdown scheme of said generic article of clothing;

converting said three-dimensional models of said components of said selected article of clothing into a two-dimensional images of said components of said selected article of clothing;

assembling said two-dimensional images of said components of said selected article of clothing on said image of said person and thereby generating a two-dimensional image of said article of clothing on said image of said person.

54. The process of claim 53, wherein said determining a component breakdown scheme further includes providing an hidden area instruction, said hidden area instruction defines on a user's picture that includes said image of said person using at least one said server and said client computer an area of the three-dimensional model of the generic article of clothing that is hidden from view when the three-dimensional model of the generic article of clothing is superimposed at the location on the image of the person.

* * * * *